(12) United States Patent
Mori et al.

(10) Patent No.: US 10,543,868 B2
(45) Date of Patent: Jan. 28, 2020

(54) DEVICE FOR CONTROLLING AC ROTARY MACHINE AND DEVICE FOR CONTROLLING ELECTRIC POWER STEERING

(71) Applicant: Mitsubishi Electric Corporation, Tokyo (JP)

(72) Inventors: Tatsuya Mori, Tokyo (JP); Shunsuke Nakajima, Tokyo (JP); Isao Kezobo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 65 days.

(21) Appl. No.: 15/572,574

(22) PCT Filed: May 27, 2015

(86) PCT No.: PCT/JP2015/065241
§ 371 (c)(1),
(2) Date: Nov. 8, 2017

(87) PCT Pub. No.: WO2016/189694
PCT Pub. Date: Dec. 1, 2016

(65) Prior Publication Data
US 2018/0105201 A1    Apr. 19, 2018

(51) Int. Cl.
*B62D 5/04*    (2006.01)
*H02P 6/18*    (2016.01)
(Continued)

(52) U.S. Cl.
CPC .............. *B62D 5/0463* (2013.01); *H02P 6/18* (2013.01); *H02P 9/06* (2013.01); *H02P 21/24* (2016.02)

(58) Field of Classification Search
CPC ......... B62D 5/0463; H02P 21/24; H02P 6/10; H02P 6/18; H02P 6/183; H02P 9/06; H02P 21/05; H02P 23/00
(Continued)

(56) References Cited

U.S. PATENT DOCUMENTS

| 5,729,113 A | 3/1998 | Jansen et al. |
| 2013/0249454 A1* | 9/2013 | Mori ........................ H02P 6/16 318/400.09 |

(Continued)

FOREIGN PATENT DOCUMENTS

| JP | 2004-173340 A | 6/2004 |
| JP | 2005-117863 A | 4/2005 |

(Continued)

OTHER PUBLICATIONS

Communication dated Jan. 2, 2019, from the European Patent Office in counterpart European Application No. 15893328.3.
(Continued)

*Primary Examiner* — Bickey Dhakal
*Assistant Examiner* — Zemenay T Truneh
(74) *Attorney, Agent, or Firm* — Sughrue Mion, PLLC; Richard C. Turner

(57) ABSTRACT

When an AC rotary machine having a rotor structure for generating saliency, and including first three-phase windings and second three-phase windings is controlled, a first position estimation command to be superimposed on a voltage command or a current command directed to each of the first three-phase windings and a second position estimation command to be superimposed on a voltage command or a current command directed to each of the second three-phase windings are set to have the same frequency, and caused to have a phase difference, thereby increasing an estimation accuracy of a rotation position of the AC rotary machine.

9 Claims, 28 Drawing Sheets

(51) Int. Cl.
*H02P 9/06* (2006.01)
*H02P 21/24* (2016.01)

(58) Field of Classification Search
USPC .............................................. 318/14; 701/41
See application file for complete search history.

(56) References Cited

U.S. PATENT DOCUMENTS

| 2014/0207335 A1* | 7/2014 | Mikamo | B62D 5/046 |
| | | | 701/41 |
| 2014/0253009 A1* | 9/2014 | Kimpara | B62D 5/046 |
| | | | 318/496 |

FOREIGN PATENT DOCUMENTS

| JP | 2006-129667 A | 5/2006 | |
| JP | 2007-325406 A | 12/2007 | |
| JP | 2008-295149 A | 12/2008 | |
| JP | 2010-268597 A | 11/2010 | |
| JP | 2012165608 * | 2/2012 | .............. H02P 21/00 |
| JP | 2014-138530 A | 7/2014 | |
| JP | 5573714 B2 | 8/2014 | |

OTHER PUBLICATIONS

International Search Report for PCT/JP2015/065241 dated Aug. 4, 2015 [PCT/ISA/210].

* cited by examiner

DEVICE FOR CONTROLLING AC ROTARY MACHINE AND DEVICE FOR CONTROLLING ELECTRIC POWER STEERING

CROSS REFERENCE TO RELATED APPLICATIONS

This application is a National Stage of International Application No. PCT/JP2015/065241, filed on May 27, 2015, the contents of all of which are incorporated herein by reference in their entirety.

TECHNICAL FIELD

The present invention relates to a control device for an AC rotary machine, and to an electric power steering device including the control device.

BACKGROUND ART

Rotation position information on an AC rotary machine and information on currents flowing through the AC rotary machine are necessary for accurately controlling a rotation operation of the AC rotary machine. The rotation position information is obtained by separately mounting a rotation position sensor to the AC rotary machine. However, when the rotation position sensor is separately provided, there is a great disadvantage in terms of cost, space, and reliability. Therefore, a sensorless configuration that uses a rotation position estimated value instead of the rotation position sensor is required.

Moreover, when the rotation position sensor fails, an operation of the AC rotary machine can be continued by alternatively introducing the rotation position estimated value as the rotation position information. Due to this fact, a rotation position estimation function is required also as a backup device to be used when the rotation position sensor fails.

From this viewpoint, the following related art is known (e.g., refer to Patent Literature 1), Patent Literature 1 relates to a rotary machine including a plurality of sets of a plurality of stators coupled to one another at a neutral point. Specifically, Patent Literature 1 is constructed by estimation means and stator phase separation means.

The estimation means is configured to superimpose a high-frequency voltage signal having a frequency higher than an electrical angle frequency, to thereby estimate the rotation angle of the rotary machine based on a detected value of a high-frequency current flowing through the rotary machine in accordance with the superimposed high-frequency voltage signal. Moreover, the stator phase separation means is configured to make the phases of the currents flowing through the stators different for at least one pair of sets out of the plurality of sets. Further, the estimation means is configured to increase a degree of use of the detected value of the high-frequency current for a current that flows through the stator and has an absolute value equal to or more than a predetermined value.

CITATION LIST

Patent Literature

[PTL 1] JP 5573714 B

SUMMARY OF INVENTION

Technical Problem

However, the related art has the following problem.

In Patent Literature 1, the phases of the currents flowing through the stator are different between a set constructed by U, V, and W phases and a set constructed by X, Y, and Z phases. This configuration prevents the currents flowing through both of the sets from simultaneously entering a zero-cross period, and the rotation angle is estimated based on the current flowing through the set that is not in the zero-cross period.

However, as the high-frequency voltage signals (vdhr and vqhr), the same value is superimposed on the UVW winding side and the XYZ winding side. Therefore, high-frequency current signals flowing through the rotary machine in accordance with the high-frequency voltage signals are the same in the phase on rotational two axes (d-q axes) on the UVW winding side and the XYZ winding side.

Thus, "torque ripple, vibration, and noise generated by the high-frequency voltage signal components out of the currents flowing through the X, Y, and Z windings" are added to "torque ripple, vibration, and noise generated by the high-frequency voltage signal components out of the currents flowing through the U, V, and W windings" in the same phase from the rotary machine. As a result, there arises such a problem that the torque ripple, the vibration, and the noise of the high-frequency voltage signal components generated in the rotary machine increase.

Moreover, in order to suppress the torque ripple, the vibration, and the noise of the high-frequency voltage signal components, a decrease in the amplitude of the high-frequency voltage signal is conceivable. However, when the amplitude of the high-frequency voltage signal is decreased, there arises such a problem that rotation position estimation performance decreases in the estimation means due to a decrease in the S/N ratio and a quantization error caused by an AD resolution.

The present invention has been made in view of the above-mentioned problems, and therefore has an object to provide a control device for an AC rotary machine and a control device for an electric power steering, which are capable of suppressing torque ripple, vibration, and noise of high-frequency voltage signal components, and increasing rotation position estimation accuracy.

Solution to Problem

According to one embodiment of the present invention, there is provided a control device for a rotary machine, including: an AC rotary machine having a rotor structure for generating saliency, and including first three-phase windings and second three-phase windings; a first current detector configured to detect a current flowing through each of the first three-phase windings as a first winding current; a second current detector configured to detect a current flowing through each of the second three-phase windings as a second winding current; a controller configured to calculate a first voltage command so that the first winding current detected by the first current detector matches a first current command, which is a command value directed to the first winding current, and to calculate a second voltage command so that the second winding current detected by the second current detector matches a second current command, which is a command value directed to the second winding current; a first power converter configured to apply a voltage to each phase of the first three-phase windings based on the first voltage command; a second power converter configured to apply a voltage to each phase of the second three-phase windings based on the second voltage command; a position estimation command generator configured to generate a first position estimation command having a first frequency, and to generate a second position estimation command having the first frequency; and a rotation position estimator configured to extract an amplitude value of a component of the first frequency based on at least one of the first winding current or the second winding current, to thereby estimate a rotation position of the AC rotary machine based on a magnitude of the amplitude value, in which: the position estimation command generator is configured to output the first position estimation command and the second position estimation command while providing a phase difference between the first position estimation command and the second position estimation command; and the controller is configured to superimpose the first position estimation command on the first voltage command to output a result of superimposition to the first power converter, and to superimpose the second position estimation command on the second voltage command to output a result of superimposition to the second power converter.

Advantageous Effects of Invention

According to the present invention, a phase difference is provided between the torque ripple, the sound, and the vibration generated by the first position estimation command and the torque ripple, the sound, and the vibration generated by the second position estimation command by providing the phase difference between the first position estimation command and the second position estimation command. As a result, the sum of the torque ripples, the sounds, and the vibrations of both of the commands is decreased compared with the case where both of the commands are in the same phase. Thus, the torque ripple, the sound, and the vibration generated by the AC rotary machine can be decreased with respect to the amplitude values of the first position estimation command and the second position estimation command compared with the related art.

In other words, according to the present invention, when the torque ripple, the vibration, and the sound need to be values equal to or less than respective predetermined values, the amplitudes of the first position estimation command and the second position estimation command can be set to larger values. As a result, the present invention can increase the S/N ratio, and decrease the influence of the quantization error caused by the AD resolution compared with the related art. Thus, the present invention suppresses the torque ripple, the vibration, and the noise of the high-frequency voltage signal components, and can increase the rotation position estimation accuracy, which are novel remarkable effects.

DESCRIPTION OF EMBODIMENTS

Figure 1:
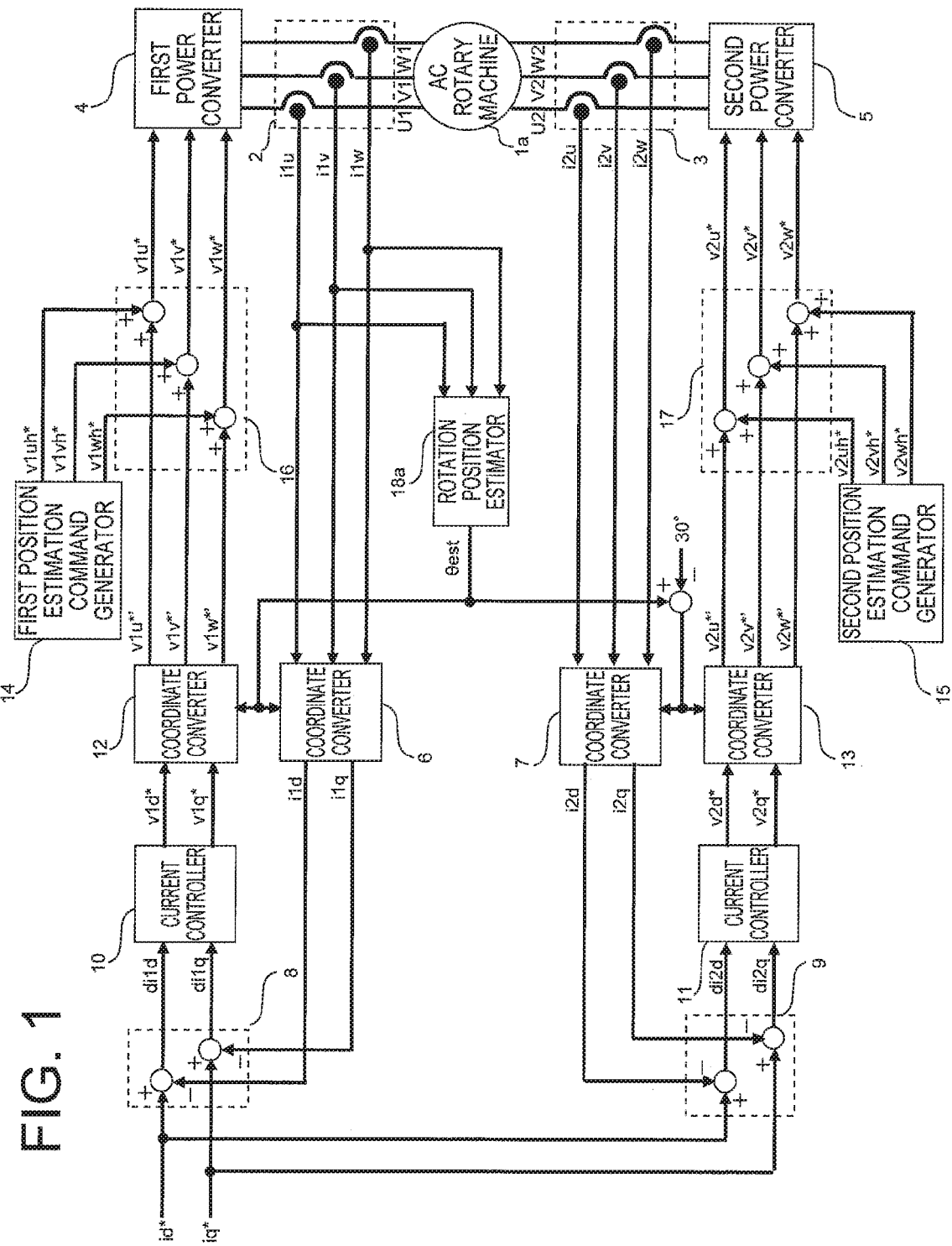
FIG. 1 is a diagram for illustrating an overall configuration of a control device for an AC rotary machine according to a first embodiment of the present invention.

A description is now given of a control device for an AC rotary machine and a control device for an electric power steering according to exemplary embodiments of the present invention referring to the drawings.

First Embodiment

Figure 2:
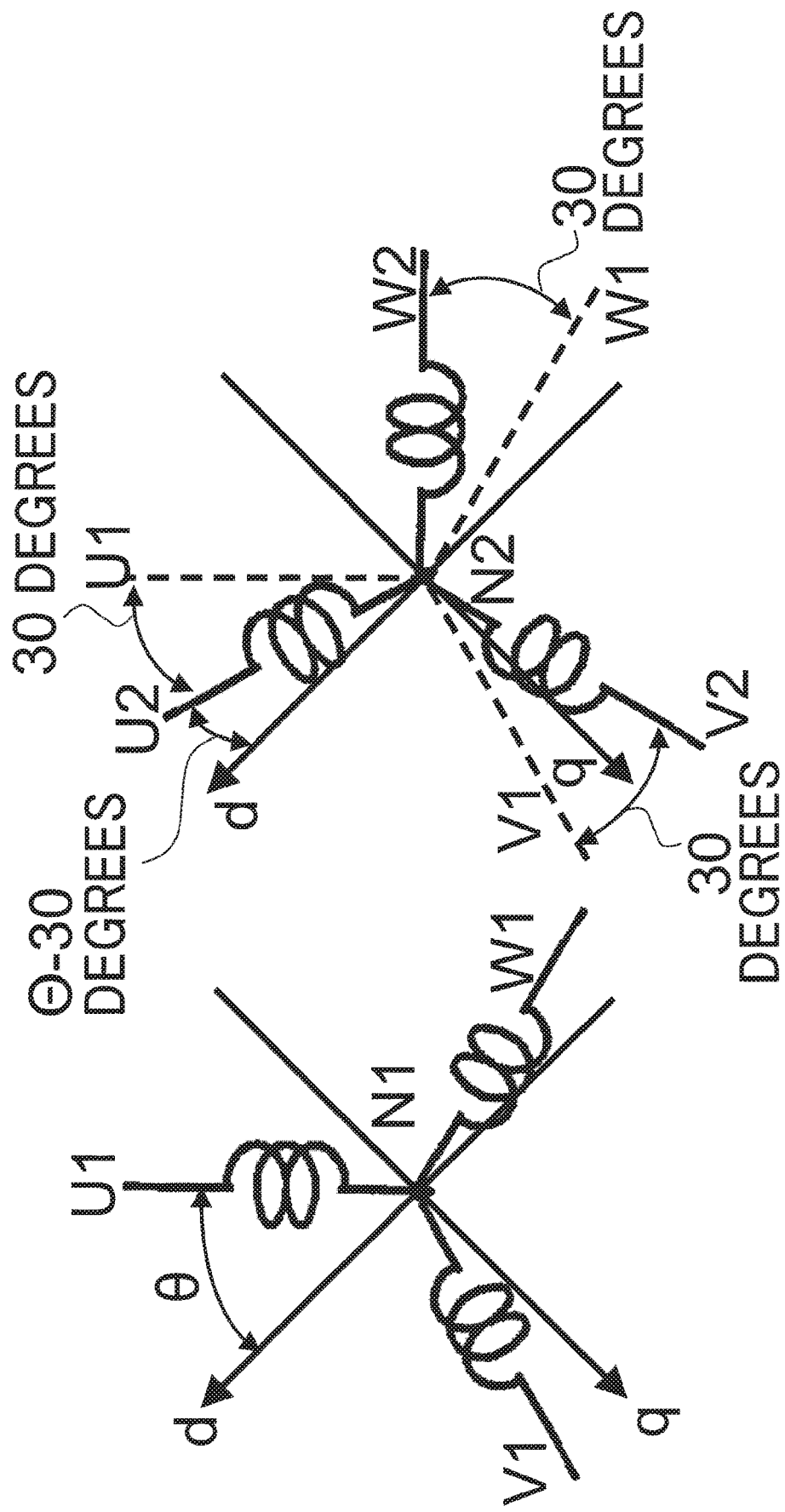
FIG. 2 is a diagram for illustrating a configuration of a three-phase AC rotary machine used as the AC rotary machine in the first embodiment of the present invention.

FIG. 1 is a diagram for illustrating an overall configuration of a control device for an AC rotary machine according to a first embodiment of the present invention. Further, FIG. 2 is a diagram for illustrating a configuration of a three-phase AC rotary machine used as the AC rotary machine in the first embodiment of the present invention. As illustrated in FIG. 2, an AC rotary machine 1a illustrated in FIG. 1 is a three-phase AC synchronous rotary machine in which first three-phase windings U1, V1, and W1 connected at a neutral point N1 and second three-phase windings U2, V2, and W2 connected at a neutral point N2 are stored in a stator of the rotary machine without an electrical connection.

The U1 winding and the U2 winding, the V1 winding and the V2 winding, and the W1 winding and the W2 winding respectively have a phase difference of 30 degrees from each other. In FIG. 2, a case in which both the first three-phase windings and the second three-phase windings have Y connections is exemplified as the AC rotary machine 1a, but the present invention can be applied to a case of delta ($\Delta$) connections.

Moreover, a rotor is configured to generate field magnetic flux through permanent magnets, which is not shown in FIG. 2. Then, the direction of the magnetic flux generated by the rotor is defined as a d axis, and a direction advanced by 90 degrees in the electrical angle from the d axis is defined as a q axis.

A rotation position (rotation angle) of the d axis with respect to the U1 winding serving as a reference is defined as $\theta$ degrees. In this case, a phase difference between the U1 winding and the U2 winding is 30 degrees, and the angle of the d axis with respect to the U2 winding is thus $\theta$-30 degrees. Moreover, the rotor has a relationship of Ld<Lq between a d-axis inductance Ld and a q-axis inductance Lq of the AC rotary machine. In other words, the AC rotary machine in the first embodiment has a structure having saliency.

A first current detector 2 uses current detectors such as shunt resistors and Hall elements to detect first winding currents i1u, i1v, and i1w respectively flowing through the first three-phase windings U1, V1, and W1 of the AC rotary machine 1a.

A second current detector 3 uses current detectors such as shunt resistors and Hall elements to detect second winding currents i2u, i2v, and i2w respectively flowing through the second three-phase windings U2, V2, and W2 of the AC rotary machine 1a.

A first power converter 4 uses power converters such as inverters and matrix converters to carry out modulation processing through a known technology, for example, the PWM, the PAM, and the like, based on first voltage commands v1u*, v1v*, and v1w* described later, thereby applying voltages to the respective phases (U1, V1, and W1) of the first three-phase windings of the AC rotary machine 1a.

A second power converter 5 uses power converters such as inverters and matrix converters to carry out modulation processing through a known technology, for example, the PWM, the PAM, and the like, based on second voltage commands v2u*, v2v*, and v2w* described later, thereby applying voltages to the respective phases (U2, V2, and W2) of the second three-phase windings of the AC rotary machine 1a.

A coordinate converter 6 is configured to calculate first winding currents i1d and i1q on the rotational two axes (d-q axes) based on the first winding currents i1u, i1v, and i1w detected by the first current detector 2 and a rotation position estimated value $\theta$est described later.

A coordinate converter 7 is configured to calculate second winding currents i2d and i2q on the rotational two axes (d-q axes) based on the second winding currents i2u, i2v, and i2w detected by the second current detector 3 and the rotation position estimated value $\theta$est described later.

A current command id* is a command value for the currents i1d and i2d on the rotational two axes (d-q axes). Moreover, a current command iq* is a command value for the currents i1q and i2q on the rotational two axes (d-q axes). Those current commands id* and iq* correspond to control commands for controlling the AC rotary machine 1a. The control commands are not limited to the current commands id* and iq*. When the speed control, the V/f control, or the like, which is a publicly-known technology, is used, a speed command may be set as the control command.

A subtractor 8 is configured to subtract the first winding current i1d on the rotational two axes (d-q axes) acquired from the coordinate converter 6 from the current command id*, and output a difference di1d (=id*−i1d). Similarly, the subtractor 8 is configured to subtract the first winding current i1q on the rotational two axes (d-q axes) acquired from the coordinate converter 6 from the current command iq*, and output a difference di1q (=iq*−i1q).

A subtractor 9 is configured to subtract the second winding current i2d on the rotational two axes (d-q axes) acquired from the coordinate converter 7 from the current command id*, and output a difference di2d (=id*−i2d). Similarly, the subtractor 9 is configured to subtract the second winding current i2q on the rotational two axes (d-q axes) acquired from the coordinate converter 7 from the current command iq*, and output a difference di2q (=iq*−i2q).

A current controller 10 is configured to carry out proportional-integral control or proportional control so that both the differences di1d (=id*−i1d) and di1q (=iq*−i1q) acquired from the subtractor 8 match 0, thereby calculating first voltage commands v1d* and v1q* on the rotational two axes (d-q axes).

A current controller 11 is configured to carry out proportional-integral control or proportional control so that both the differences di2d (=id*−i2d) and di2q (=iq*−i2q) acquired from the subtractor 9 match 0, thereby calculating second voltage commands v2d* and v2q* on the rotational two axes (d-q axes).

A coordinate converter 12 is configured to calculate first three-phase voltage commands v1u*', v1v*', and v1w*' from the first voltage commands v1d* and v1q* on the rotational two axes (d-q axes) acquired from the current controller 10.

A coordinate converter 13 is configured to calculate second three-phase voltage commands v2u*', v2v*', and v2w*' from the second voltage commands v2d* and v2q* on the rotational two axes (d-q axes) acquired from the current controller 11.

Figure 3:
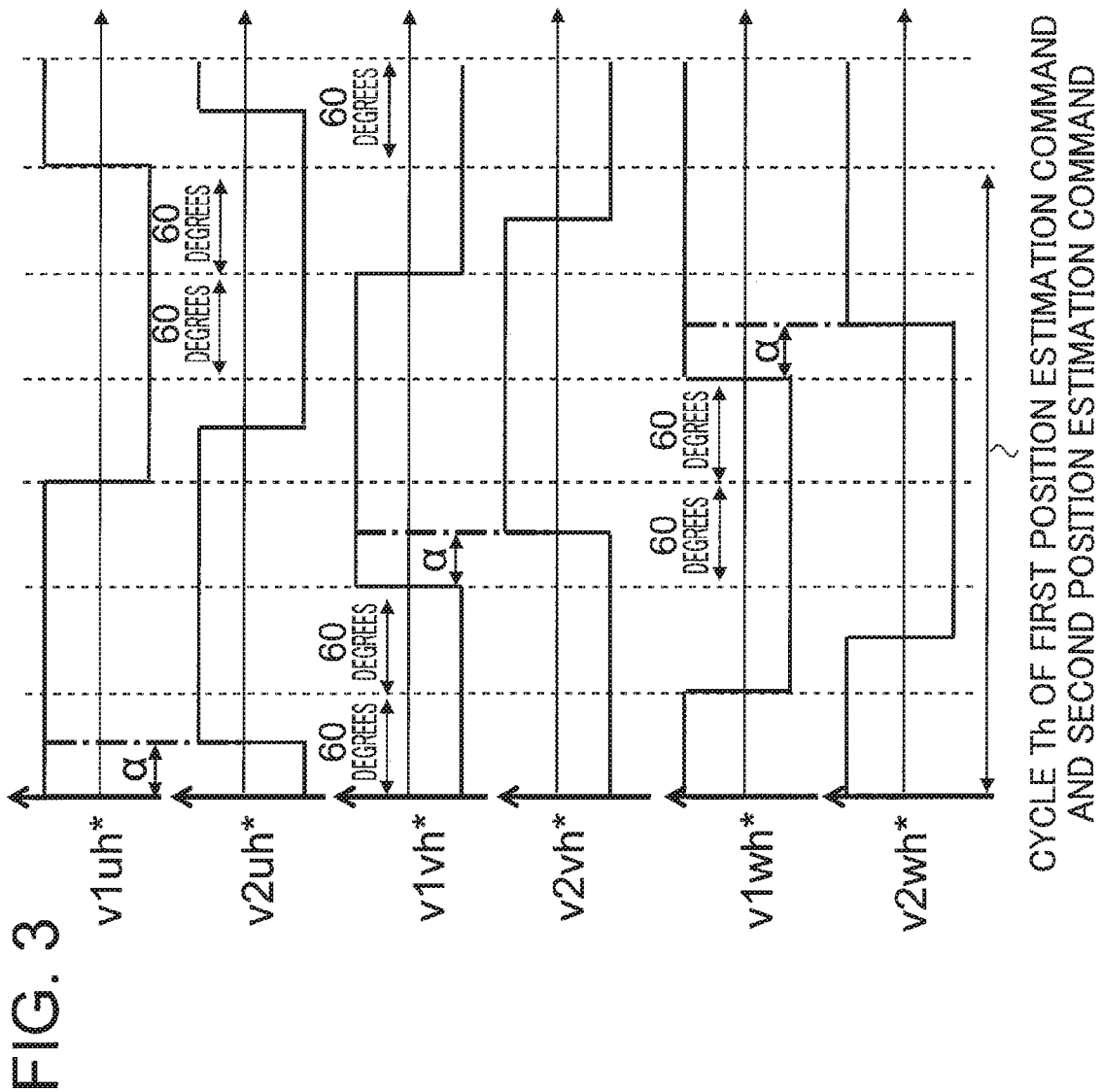
FIG. 3 is a diagram for illustrating temporal changes in position estimation commands output respectively from a first position estimation command generator and a second position estimation command generator in the first embodiment of the present invention.

FIG. 3 is a diagram for illustrating temporal changes in position estimation commands output respectively from a first position estimation command generator 14 and a second position estimation command generator 15 in the first embodiment of the present invention.

As illustrated in FIG. 3, the first position estimation command generator 14 is configured to output first position estimation commands v1uh*, v1vh*, and v1wh* at a cycle Th. The frequency (1/Th) of the first position estimation commands is set so as to be sufficiently higher than an electrical angle frequency corresponding to the rotation speed of the AC rotary machine 1a. Specifically, the frequency (1/Th) of the position estimation command is set so as to be twice as high as the electrical angle frequency corresponding to the rotation speed of the AC rotary machine 1a or more.

The cycle Th is set to 360 degrees. v1vh* has a phase lag of 120 (60×2) degrees with respect to v1uh*. v1wh* has a phase lag of 120 (60×2) degrees with respect to v1vh*. Moreover, the respective amplitudes of v1uh*, v1vh*, and v1wh* are the same.

As illustrated in FIG. 3, the second position estimation command generator 15 is configured to output second position estimation commands v2uh*, v2vh*, and v2wh* at the cycle Th. The frequency (1/Th) and the amplitude of the second position estimation commands are the same as those of the first position estimation commands. Moreover, v2uh*, v2vh*, and v2wh* have a phase difference of α [degrees] respectively with respect to v1uh*, v1vh*, and v1wh*. A description is later given of the phase difference α [degrees].

A superimposing device 16 is configured to respectively superimpose the first position estimation commands v1uh*, v1vh*, and v1wh* on the first voltage commands v1u*', v1v*', and v1w*', which are the outputs of the coordinate converter 12, thereby outputting first voltage commands v1u*, v1v*, and v1w*.

A superimposing device 17 is configured to respectively superimpose the second position estimation commands v2uh*, v2vh*, and v2wh* on the second voltage commands v2u*', v2v*', and v2w*', which are the outputs of the coordinate converter 13, thereby outputting second voltage commands v2u*, v2v*, and v2w*.

Figure 4:
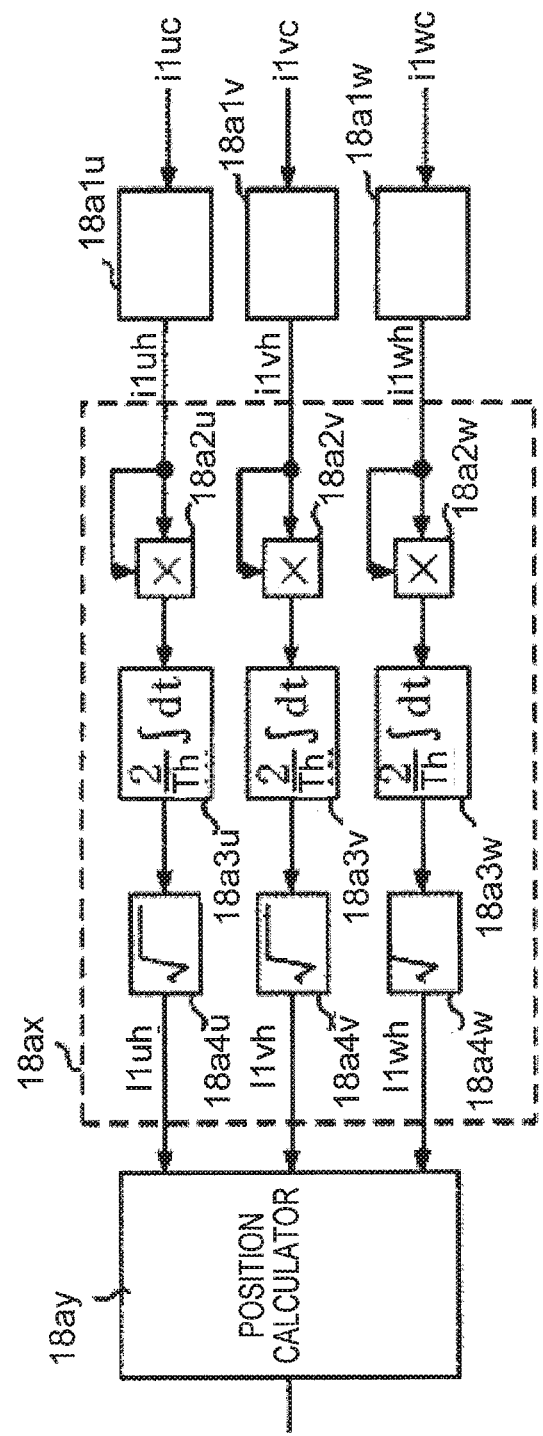
FIG. 4 is a diagram for illustrating an internal configuration of a rotation position estimator in the first embodiment of the present invention.

A description is now given of a rotation position estimator 18a. FIG. 4 is a diagram for illustrating an internal configuration of the rotation position estimator 18a in the first embodiment of the present invention. As illustrated in FIG. 4, the rotation position estimator 18a includes three current extractors 18a1u, 18a1v, and 18a1w, an amplitude calculator 18ax, and a position calculator 18ay.

As described above, the first position estimation commands v1uh*, v1vh*, and v1wh* are respectively superimposed on the first three-phase voltage commands v1u*, and v1v*, and v1w* by the superimposing device 16. Therefore, position estimation currents i1uh, i1vh, and i1wh having the same frequency component as those of the position estimation commands are respectively included in the first winding currents i1u, i1v, and i1w.

Thus, the respective current extractors 18a1u, 18a1v, and 18a1w are configured to extract the position estimation currents i1uh, i1vh, and i1wh having the same frequency components as those of the first position estimation commands from the first winding currents i1u, i1v, and i1w detected by the first current detector 2.

As a specific configuration of each of the current extractors 18a1u, 18a1v, and 18a1w, a band-pass filter can be used to extract each of the position estimation currents i1uh, i1vh, and i1wh. Alternatively, each of the first winding currents i1u, i1v, and i1w may be input to notch filters, thereby attenuating the same frequency components as those of the first position estimation commands v1uh*, v1vh*, and v1wh*. Then, each of currents that have passed through the respective notch filters may be subtracted from each of the first winding currents i1u, i1v, and i1w, thereby extracting each of the position estimation currents i1uh, i1vh, and i1wh.

Figure 5:
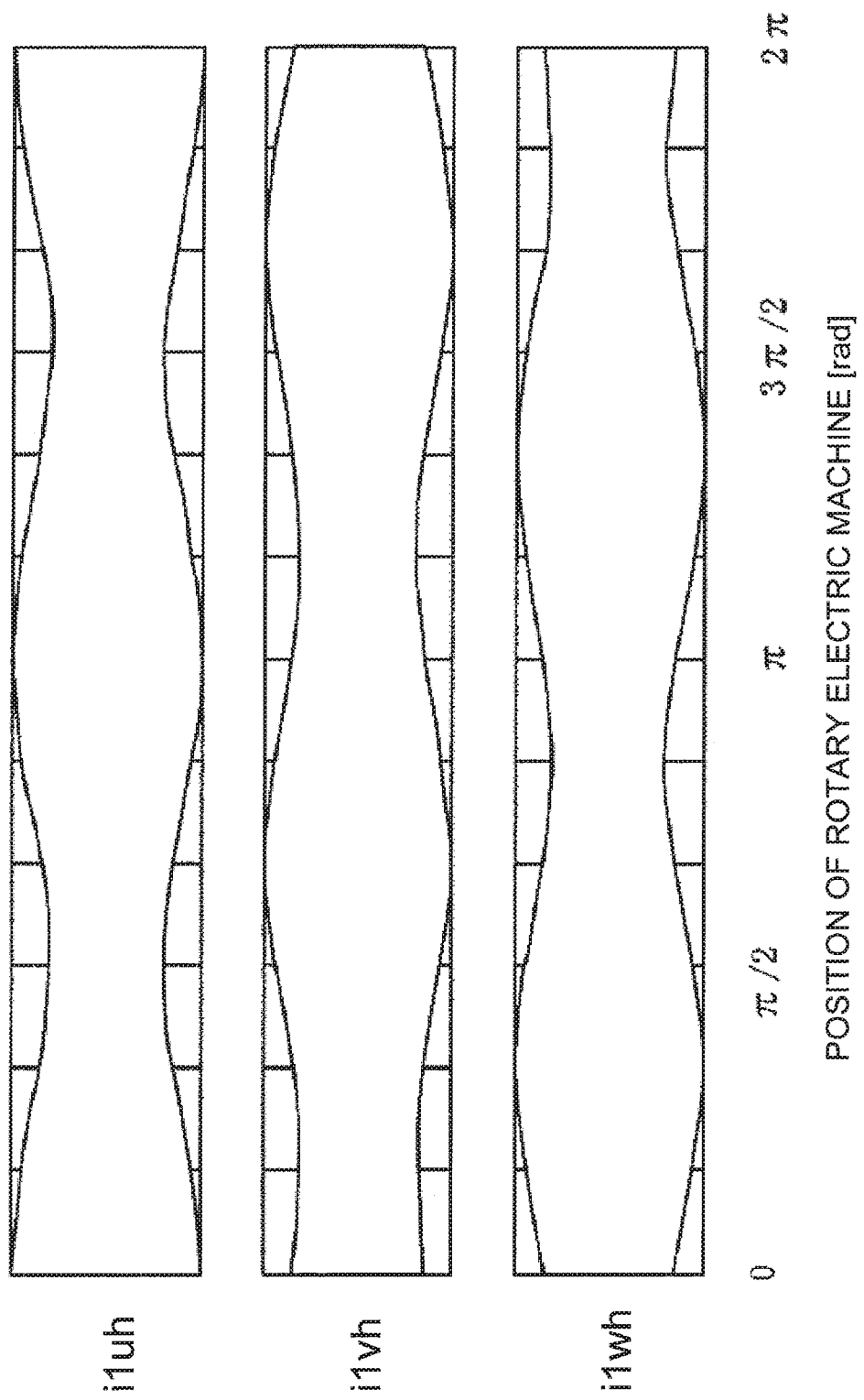
FIG. 5 is a diagram for illustrating output waveforms of respective current extractors in the first embodiment of the present invention.

FIG. 5 is a diagram for illustrating output waveforms of respective current extractors 18a1u, 18a1v, and 18a1w in the first embodiment of the present invention. When the first position estimation commands v1uh*, v1vh*, and v1wh*, which are the three-phase AC as illustrated in FIG. 3, are applied to the AC rotary machine 1a, as illustrated in FIG. 5, due to the saliency of the AC rotary machine, each of the position estimation currents i1uh, i1vh, and i1wh extracted by each of the current extractors 18a1u, 18a1v, and 18a1w changes in the amplitude in a cosine form in accordance with the rotation position θ of the AC rotary machine 1a.

This change is represented by Expression (1).

$$i_{1uh} = \left\{I_h + \frac{I_{ha}}{2} \cdot \cos(2\theta)\right\} \cdot \sin(\omega_h t)$$
$$i_{1vh} = \left\{I_h + \frac{I_{ha}}{2} \cdot \cos\left\{2\left(\theta + \frac{2\pi}{3}\right)\right\}\right\} \cdot \sin\left(\omega_h t - \frac{2\pi}{3}\right) \quad (1)$$
$$i_{1wh} = \left\{I_h \frac{I_{ha}}{2} \cdot \cos\left\{2\left(\theta - \frac{2\pi}{3}\right)\right\}\right\} \cdot \sin\left(\omega_h t - \frac{4\pi}{3}\right)$$

In Expression (1), Ih is an average of the amplitude of the position estimation current, Iha is a change amount in the position estimation current in accordance with the rotation position, and ωh is an angular frequency of the position estimation command.

Expression (1) includes information on the rotation position θ of the AC rotary machine 1a. Thus, the estimated value θest of the rotation position θ of the AC rotary machine 1a can be obtained by obtaining the position estimation currents I1uh, I1vh, and I1wh.

A description is now given of a sequence of obtaining the amplitudes I1uh, I1vh, and I1wh of the position estimation currents from the position estimation currents i1uh, i1vh, and i1wh.

In general, it is known that an effective value Ix of an AC current ix having a cycle Tx is defined as Expression (2).

$$I_x = \sqrt{\frac{1}{T_x}\int_0^{T_x} i_x^2 dt} \quad (2)$$

In other words, the effective value Ix is obtained by squaring the instantaneous value ix of the AC current, integrating the squared value for the one cycle Tx, multiplying the integral by 1/Tx, and obtaining the square root of the product. Moreover, an amplitude Ixamp of the AC current ix is obtained by using the effective value Ix in accordance with Expression (3).

$$I_{xamp} = \sqrt{2} I_x = \sqrt{\frac{2}{T_x}\int_0^{T_x} i_x^2 dt} \quad (3)$$

Thus, the amplitude calculator 18ax can obtain the amplitudes I1uh, I1vh, and I1wh of the position estimation currents by carrying out the calculation represented by Expression (3). Specifically, multipliers 18a2u, 18a2v, and 18a2w are respectively configured to calculate squares of the position estimation currents i1uh, i1vh, and i1wh. Further, integrators 18a3u, 18a3v, and 18a3w are respectively configured to integrate the squares of the position estimation currents i1uh, i1vh, and i1wh for the cycle Th, and multiply the integrals by 2/Th.

Further, multipliers 18a4u, 18a4v, and 18a4w are respectively configured to apply the square-root calculation to calculation results of the integrators 18a3u, 18a3v, and 18a3w, thereby calculating amplitudes I1uh, I1vh, and I1wh of the position estimation currents.

Figure 6:
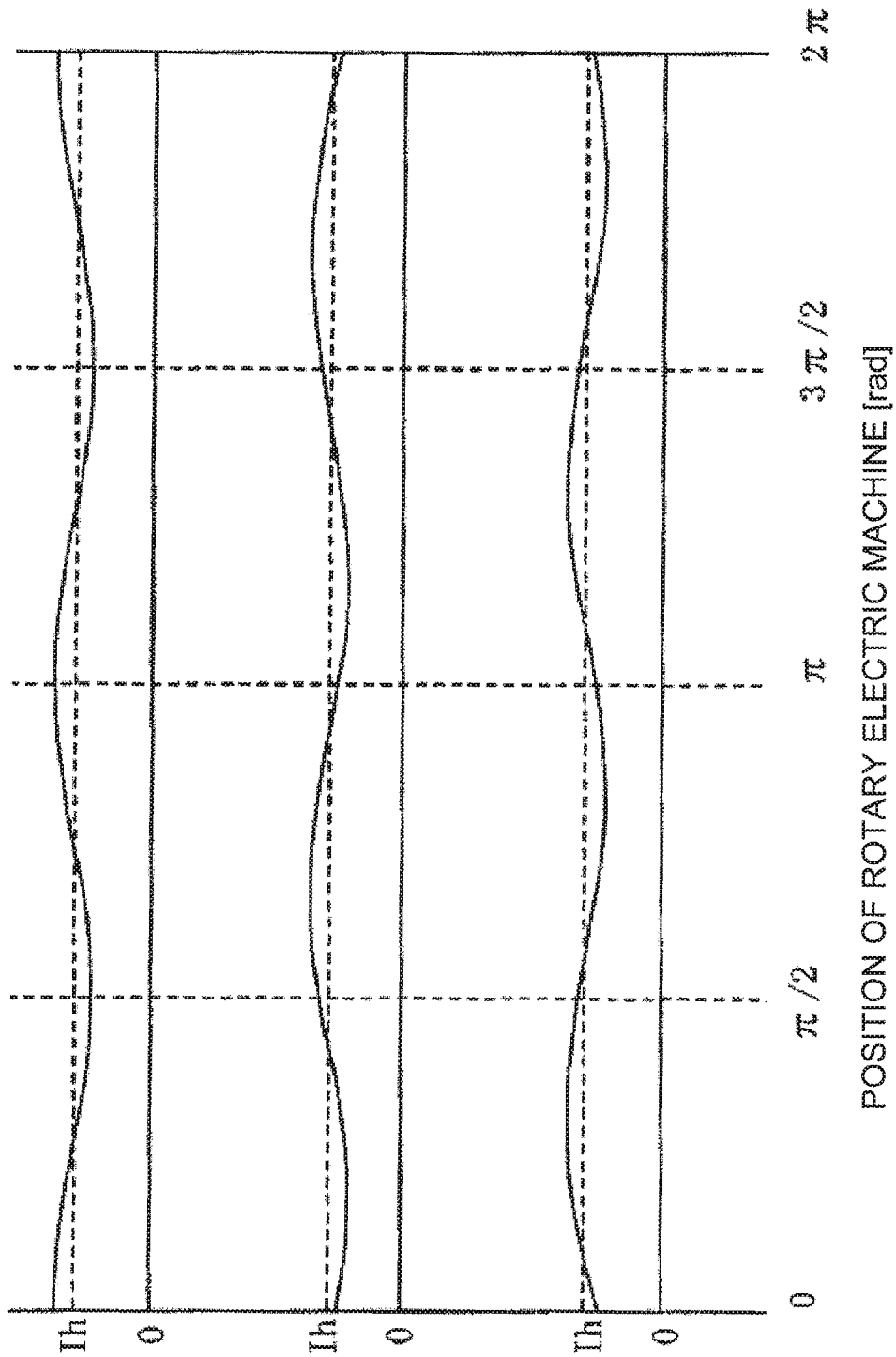
FIG. 6 is a diagram for illustrating output waveforms of an amplitude calculator in the first embodiment of the present invention.

FIG. 6 is a diagram for illustrating output waveforms of the amplitude calculator 18ax in the first embodiment of the present invention. As illustrated in FIG. 6, an offset Ih is superimposed on the amplitudes I1uh, I1vh, and I1wh of the position estimation currents obtained in the amplitude calculator 18ax, and the amplitudes I1uh, I1vh, and I1wh change at a half cycle of the rotation position θ of the AC rotary machine 1a.

Thus, the position calculator 18ay first subtracts the offset Ih from each of the amplitudes I1uh, I1vh, and I1wh of the position estimation currents, thereby calculating respective position calculation signals dI1uh, dI1vh, and dI1wh as represented by Expression (4).

$$dI_{1uh} = I_{1uh} - I_h = \frac{I_{ha}}{2} \cdot \cos(2\theta)$$
$$dI_{1vh} = I_{1vh} - I_h = \frac{I_{ha}}{2} \cdot \cos\left\{2\left(\theta + \frac{2\pi}{3}\right)\right\} \quad (4)$$
$$dI_{1wh} = I_{1wh} - I_h = \frac{I_{ha}}{2} \cdot \cos\left\{2\left(\theta - \frac{2\pi}{3}\right)\right\}$$

On this occasion, the offset Ih can be obtained based on Expression (5) because the amplitudes I1uh, I1vh, and I1wh of the position estimation currents have a three-phase balance.

$$I_h = \frac{I_{1uh} + I_{1vh} + I_{1wh}}{3} \quad (5)$$

Figure 7:
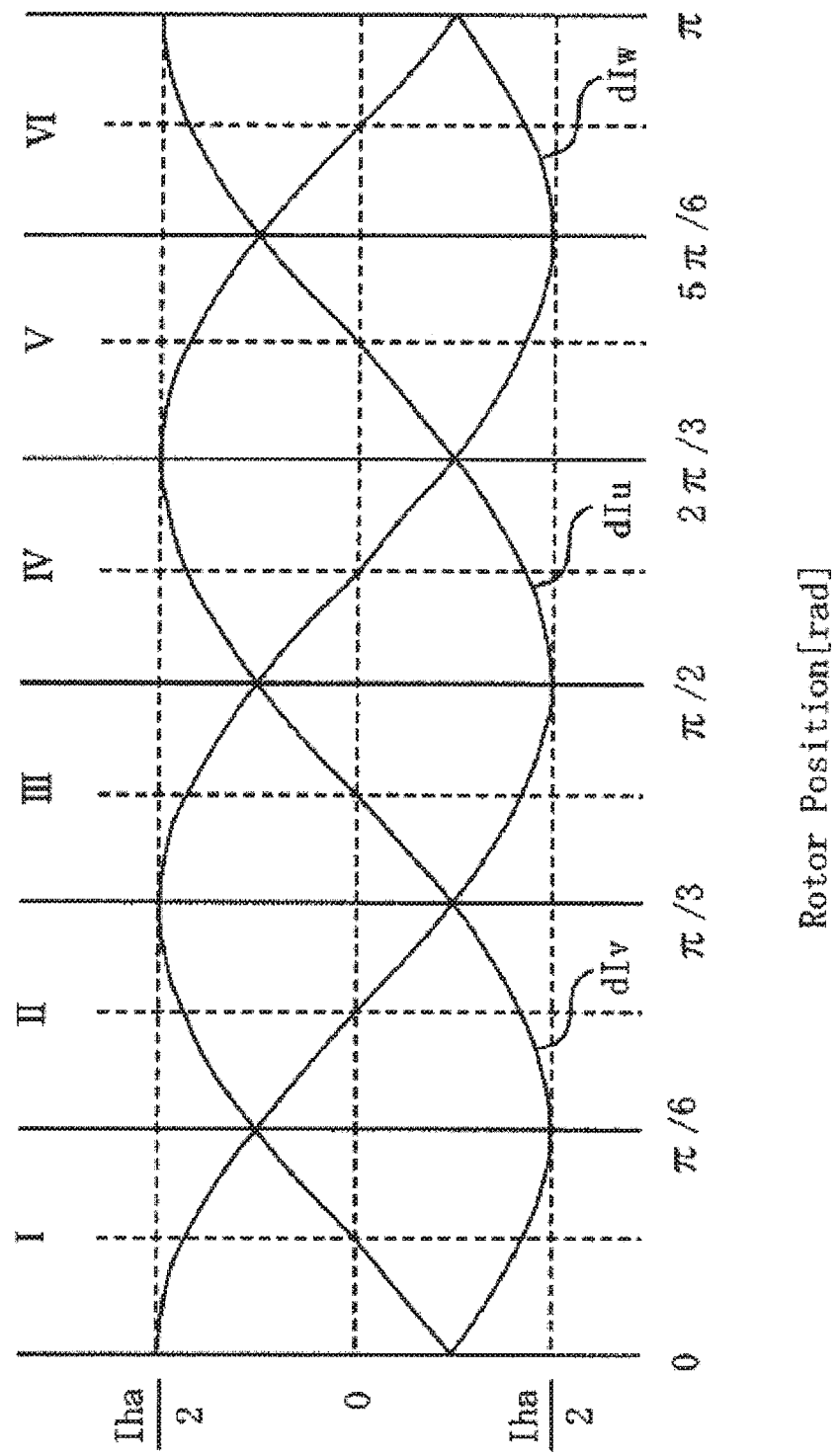
FIG. 7 is a diagram for illustrating waveforms of respective position calculation signals in the first embodiment of the present invention.

FIG. 7 is a diagram for illustrating waveforms of the respective position calculation signals dI1uh, dI1vh, and dI1wh in the first embodiment of the present invention. As illustrated in FIG. 7, the respective position calculation signals dI1uh, dI1vh, and dI1wh, are balanced three-phase ACs without the offset with respect to the rotation position θ of the AC rotary machine 1a.

Thus, the estimated position θest of the rotation position θ can be calculated by applying arccosine operation to any one of the respective position calculation signals dI1uh, dI1vh, and dI1wh. Alternatively, the estimated position θest of the rotation position θ may be obtained based on the respective position calculation signals dI1uh, dI1vh, and dI1wh in accordance with Expression (6).

$$\theta_{est} = \frac{1}{2}\mathrm{atan}\left(\frac{\frac{\sqrt{3}}{2}(dI_{1vh} - dI_{1wh})}{dI_{1uh} - 0.5 dI_{1vh} - 0.5 dI_{1wh}}\right) \quad (6)$$

A description is now given of a relationship among the amplitudes Iha/2 of the respective position calculation signals dI1uh, dI1vh, and dI1wh, the phase difference α between the first position estimation command and the second position estimation command, and the torque ripple of the frequency components of the position estimation commands generated by the AC rotary machine 1a.

An estimation accuracy of the rotation position estimated value θest depends on the amplitudes (Iha/2) of the respective position calculation signals dI1uh, dI1vh, and dI1wh. As the amplitudes increase, the S/N ratio is improved. As a result, influence of detection resolution of the first current detector decreases, and the estimation accuracy of the rotation position estimated value θest thus increases.

However, when the amplitudes of the first position estimation commands and the second position estimation commands are increased while the phase difference α is set to 0, the torque ripple, the vibration, and the sound caused by the first position estimation commands and the torque ripple, the vibration, and the sound caused by the second position estimation commands overlap in the same phase. As a result, torque ripple, vibration, and sound generated by the AC rotary machine a increase, which is not preferred.

Thus, the first embodiment has a technical feature of generating the phase difference between the torque ripple, the sound, and the vibration generated by the first position estimation command and the torque ripple, the sound, and the vibration generated by the second position estimation command by adjusting the phase difference α between the first position estimation command and the second phase estimation command. The control device for an AC rotary machine according to the first embodiment has such a technical feature, and can thus increase the amplitudes (Iha/2) while the torque ripple generated by the AC rotary machine 1a is suppressed to a value equal to or less than a predetermined value, resulting in an increase in the position estimation accuracy.

Figure 8:
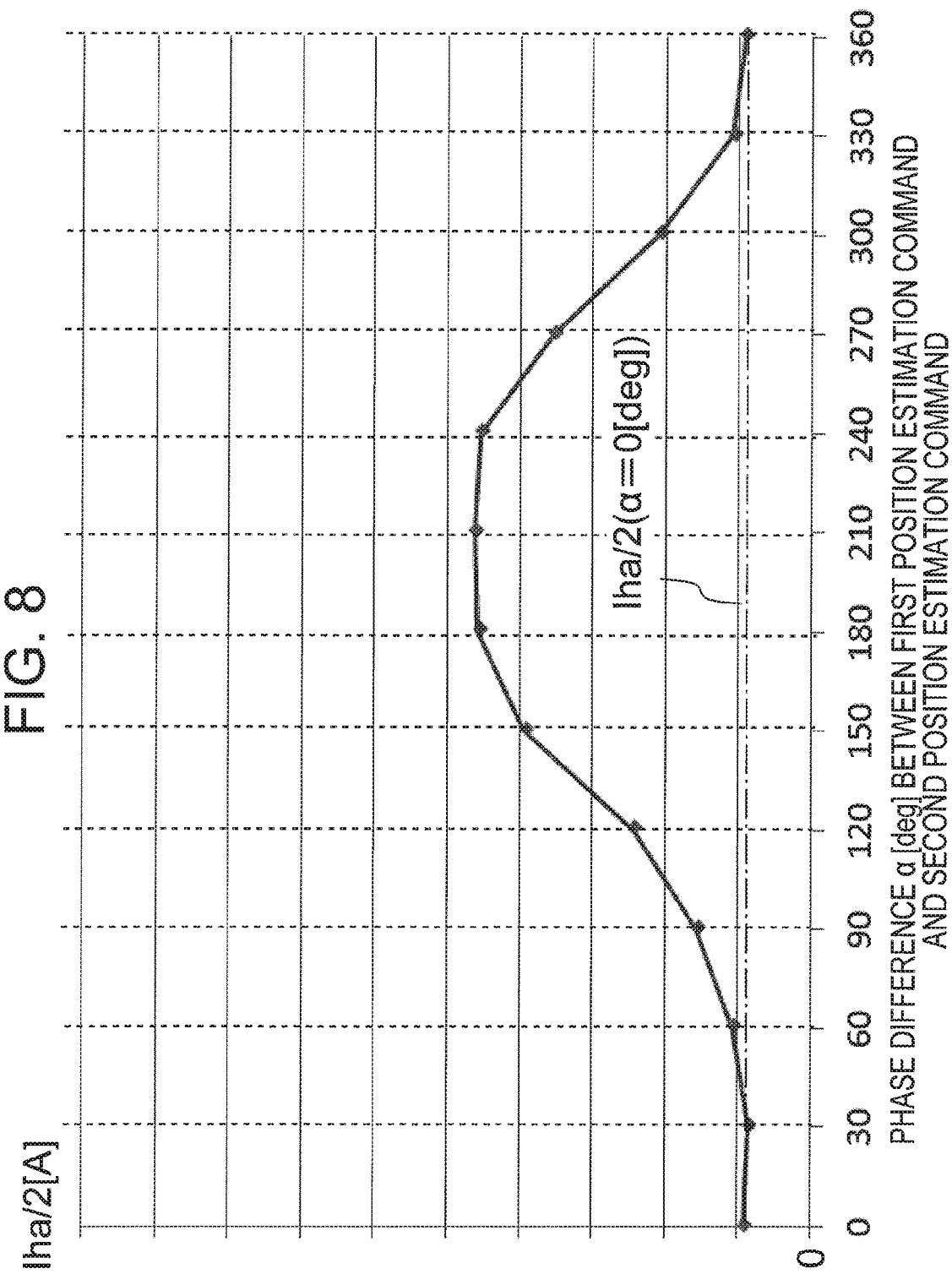
FIG. 8 is a diagram for illustrating a characteristic of an amplitude of each position calculation signal with respect to a phase difference between the first position estimation command and the second position estimation command when torque ripple of frequency component of the first position estimation command generated by the AC rotary machine is constant in the first embodiment of the present invention.

FIG. 8 is a diagram for illustrating a characteristic of an amplitude (Iha/2) of each of the position calculation signals dI1$uh$, dI1$vh$, and dI1$wh$ with respect to a phase difference between the first position estimation command and the second position estimation command when torque ripple of frequency component of the first position estimation command generated by the AC rotary machine 1a is constant in the first embodiment of the present invention.

In FIG. 8, as the amplitude increases, the amplitudes of the position estimation currents i1$uh$, i1$vh$, and i1$wh$ can be set to be larger for the same torque ripple, thereby increasing the estimation accuracy of the rotation position.

With reference to FIG. 8, the amplitudes can be set to be large over almost an entire phase difference region with respect to the amplitudes corresponding to the phase difference α=0, can particularly be set to be large in a range of α equal to or more than 90 degrees and equal to or less than 300 degrees, can further be set to be large in a range of α equal to or more than 120 degrees and equal to or less than 270 degrees, can even further be set to be large in a range of α equal to or more than 150 degrees and equal to or less than 240 degrees, and can still further be set to be large in a range of α equal to or more than 180 degrees and equal to or less than 240 degrees.

In other words, this fact means that, when the amplitudes of the position estimation currents i1$uh$, i1$vh$, and i1$wh$ are the same (Iha=constant), the torque ripple of the components of the position estimation commands generated from the AC rotary machine 1a can be decreased by setting the phase difference α in the above-mentioned ranges.

As described above, in the first embodiment, the configuration of generating the phase difference α between the first position estimation command and the second position estimation command is provided, and when the torque ripple of the frequency component of the position estimation command out of the torque ripples generated from the AC rotary machine 1a needs to be set to a value equal to or less than a predetermined value, the amplitudes of the position estimation currents can be set to be large by setting the phase difference α particularly to the range equal to or more than 90 degrees and equal to or less than 300 degrees. As a result, there is provided such an effect that the estimation accuracy of the estimated value of the rotation position of the AC rotary machine can be increased.

According to the first embodiment, the phase difference between the first three-phase winding and the second three-phase winding is set to 30 degrees, but the phase difference is not limited to 30 degrees. It should be understood that, for an AC rotary machine having a phase difference X [degrees] between a first three-phase winding and a second three-phase winding, the amplitudes can be set to be large in a range of α from X+60 to X+270 [degrees], can further be set to be large in a range of α from X+90 to X+240 [degrees], can even further be set to be large in a range of α from X+120 to X+210 [degrees], and can still further be set to be large in a range of α from X+150 to X+210 [degrees].

Second Embodiment

Figure 9:
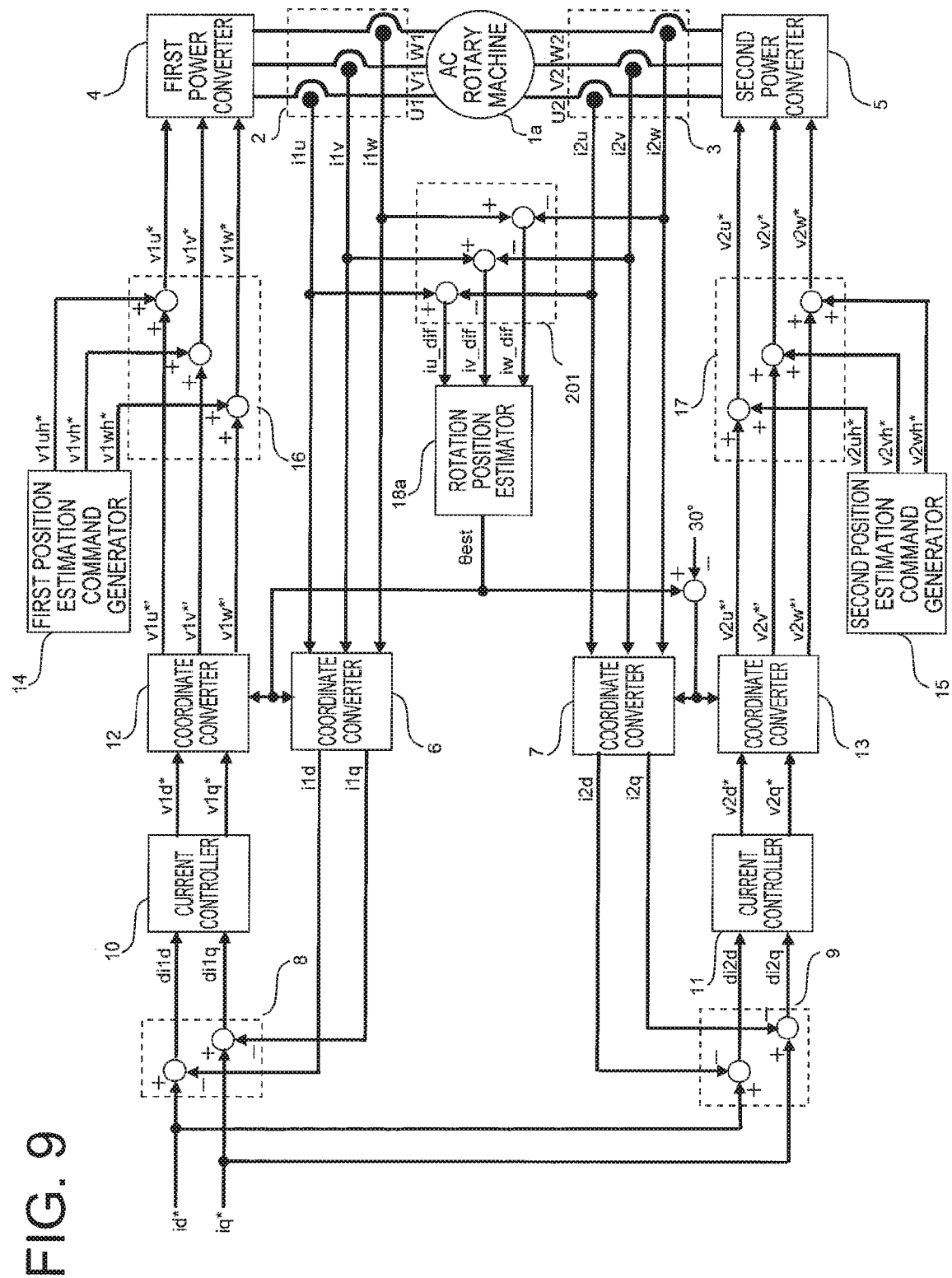
FIG. 9 is a diagram for illustrating the overall configuration of the control device for an AC rotary machine according to a second embodiment of the present invention.

FIG. 9 is a diagram for illustrating the overall configuration of the control device for an AC rotary machine according to a second embodiment of the present invention. Components corresponding to or similar to those of the first embodiment illustrated in FIG. 1 are denoted by the same reference symbols.

The configuration of FIG. 9 of the second embodiment is different from the configuration of FIG. 1 of the first embodiment in the following two points.

A point that a subtractor 201 is further provided.

A point that the rotation position estimator 18a is configured to calculate the estimated value θest of the rotation position based on the output of the subtractor 201.

The subtractor 201 is configured to calculate subtraction values iu_dif, iv_dif, and iw_dif by subtracting the second winding currents i2$u$, i2$v$, and i2$w$ detected by the second current detector 3 from the first winding currents i1$u$, i1$v$, and i1$w$ detected by the first current detector 2. Further, the rotation position estimator 18a in the second embodiment is configured to calculate the estimated value θest of the rotation position based on the subtraction values iu_dif, iv_dif, and iw_dif which are outputs of the suhtractor 201.

Figure 10:
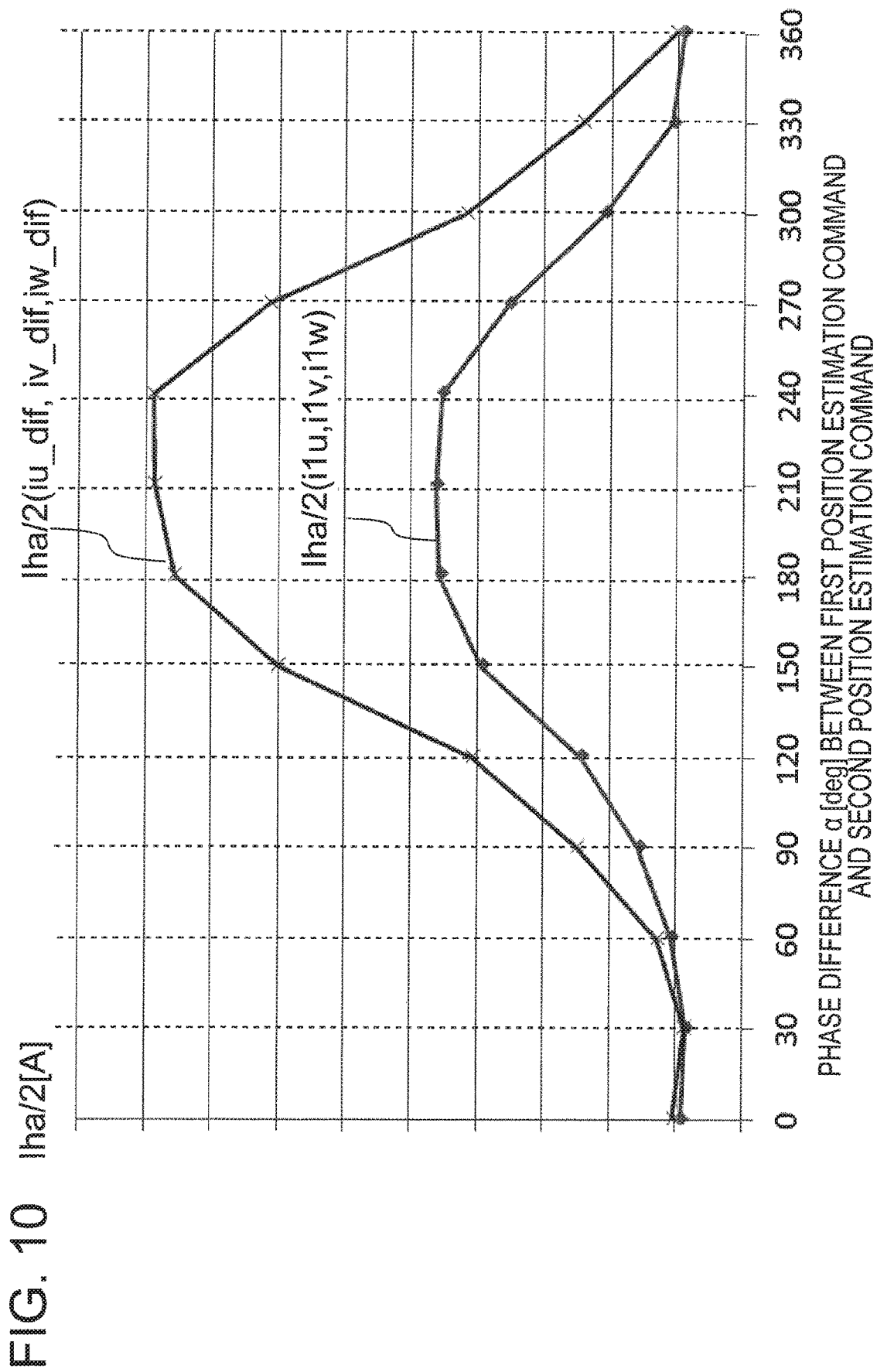
FIG. 10 is a diagram for illustrating the characteristic of the amplitude of each position calculation signal with respect to the phase difference between the first position estimation command and the second position estimation command when torque ripple of the frequency component of the first position estimation command generated by the AC rotary machine is constant in the second embodiment of the present invention.

FIG. 10 is a diagram for illustrating the characteristic of the amplitude (Iha/2) of each of the position calculation signals dI1$uh$, DI1$vh$, and dI1$wh$ with respect to the phase difference between the first position estimation command and the second position estimation command when torque ripple of the frequency component of the first position estimation command generated by the AC rotary machine 1a is constant in the second embodiment of the present invention.

A characteristic waveform denoted by "Iha/2 (iu_dif, iv_dif, iw_dif)" of FIG. 10 represents a characteristic in a case where the estimated value θest of the rotation position is calculated based on the subtraction values iu_dif, iv_dif, and iw_dif each between the first winding current and the second winding current in the second embodiment.

Meanwhile, a characteristic waveform denoted by "Iha/2 (i1$u$, i1$v$, i1$w$)" of FIG. 10 represents the characteristic in the case where the estimated value θest of the rotation position is calculated based on the first winding currents i1$u$, i1$v$, and i1$w$ in the first embodiment.

With reference to FIG. 10, according to the second embodiment, the amplitudes can be set to be large over almost the entire phase difference region with respect to the amplitudes corresponding to the phase difference α=0, can be set to be large in a range of α equal to or more than 60 degrees and equal to or less than 330 degrees, can further be set to be large in a range of α equal to or more than 90 degrees and equal to or less than 330 degrees, can even further be set to be large in a range of α equal to or more than 120 degrees and equal to or less than 300 degrees, can still further be set to be large in a range of α equal to or more than 150 degrees and equal to or less than 270 degrees, can yet further be set to be large in a range of α equal to or more than 180 degrees and equal to or less than 240 degrees, and can still yet further be set to be large in a range of α equal to or more than 150 degrees and equal to or less than 240 degrees.

From the comparison result of FIG. 10, it is appreciated that the amplitudes can be set to be larger for the same torque ripple value in the second embodiment than in the first embodiment.

As described above, according to the second embodiment, the configuration of calculating the estimated value of the rotation position based on the subtraction values between the first winding currents and the second winding currents is provided. As a result, there is provided such an effect that the estimation accuracy of the rotation position can be further increased than that of the configuration of the first embodiment.

According to the second embodiment, as in the first embodiment, the phase difference between the first three-phase winding and the second three-phase winding is set to 30 degrees, but the phase difference is not limited to 30 degrees. It should be understood that, for an AC rotary machine having a phase difference X [degrees] between a first three-phase winding and a second three-phase winding, the amplitudes can be set to be large in a range of α from X+30 to X+300 [degrees], can further be set to be large in a range of α from X+60 to X+300 [degrees], can even further be set to be large in a range of a from X+90 to X+270 [degrees], can still further be set to be large in a range of a from X+120 to X240 [degrees], and can yet still be set to be large in a range of a from X+150 to X+210 [degrees].

Third Embodiment

Figure 11:
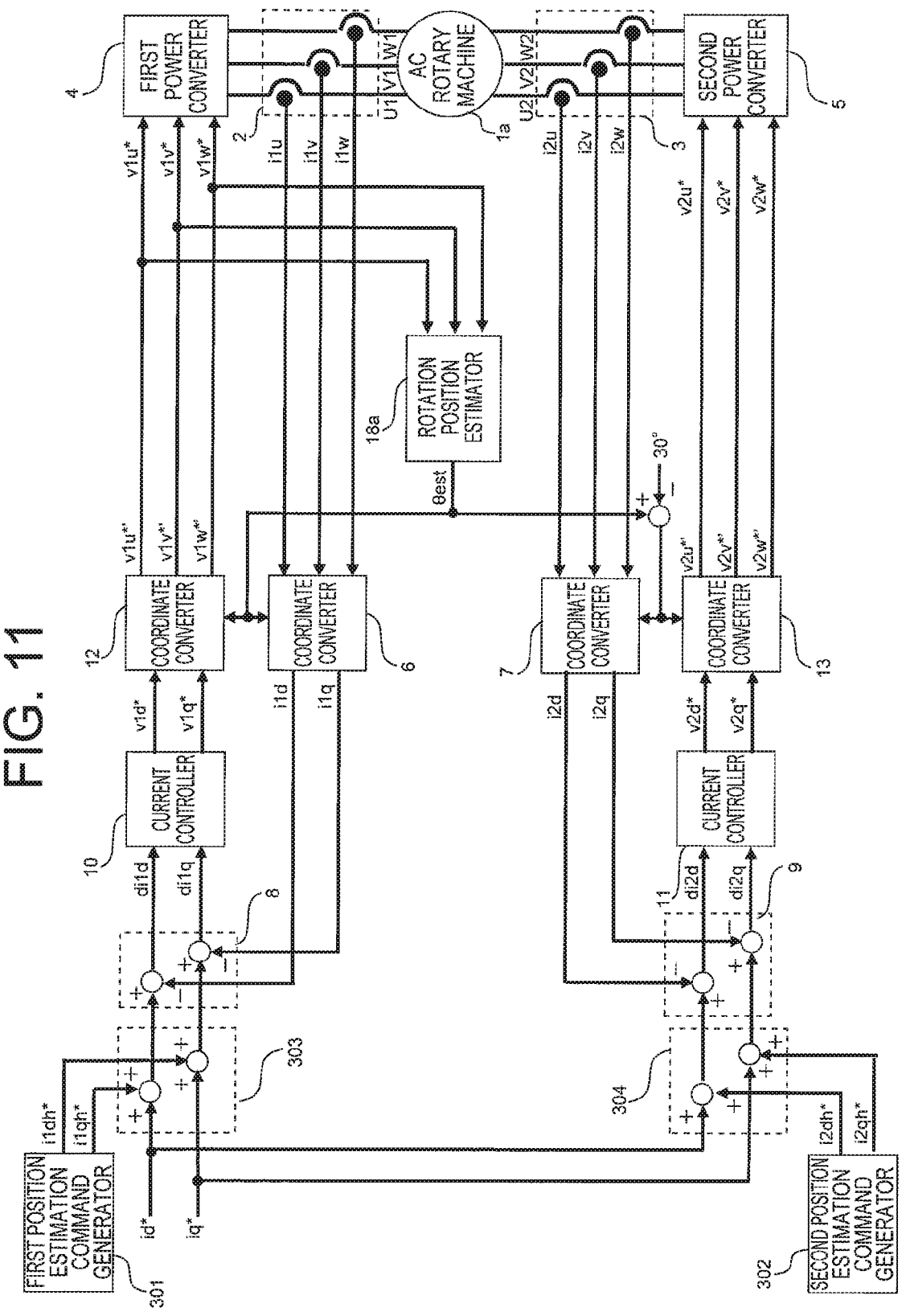
FIG. 11 is a diagram for illustrating the overall configuration of the control device for an AC rotary machine according to a third embodiment of the present invention.

FIG. 11 is a diagram for illustrating the overall configuration of the control device for an AC rotary machine according to a third embodiment of the present invention. Components corresponding to or similar to those of the first embodiment illustrated in FIG. 1 are denoted by the same reference symbols.

The configuration of FIG. 11 of the third embodiment is different from the configuration of FIG. 1 of the first embodiment in the following three points.

A point that a first position estimation command generator 301, a second position estimation command generator 302, a superimposing device 303, and a superimposing device 304 are arranged at different positions in place of the first position estimation command generator 14, the second position estimation command generator 15, the superimposing device 16, and the superimposing device 17.

A point that the first three-phase voltage commands v1$u^{*\prime}$, v1$v^*$, and v1$w^{*\prime}$ output from the coordinate converter 12 are directly supplied as the first voltage commands v1$u^*$, v1$v^*$, and v1$w^*$ to the first power converter 4, and, similarly, the second three-phase voltage commands v2$u^{*\prime}$, v2$v^{*\prime}$, and v2$w^{*\prime}$ output from the coordinate converter 13 are directly supplied as the second voltage commands v2$u^*$, v2$v^*$, and v2$w^*$ to the second power converter 5.

A point that the rotation position estimator 18a is configured to calculate the estimated value θest of the rotation position based on the first three-phase voltage commands v1$u^{*\prime}$, v1$v^{*\prime}$, and v1$w^{*\prime}$.

Figure 12:
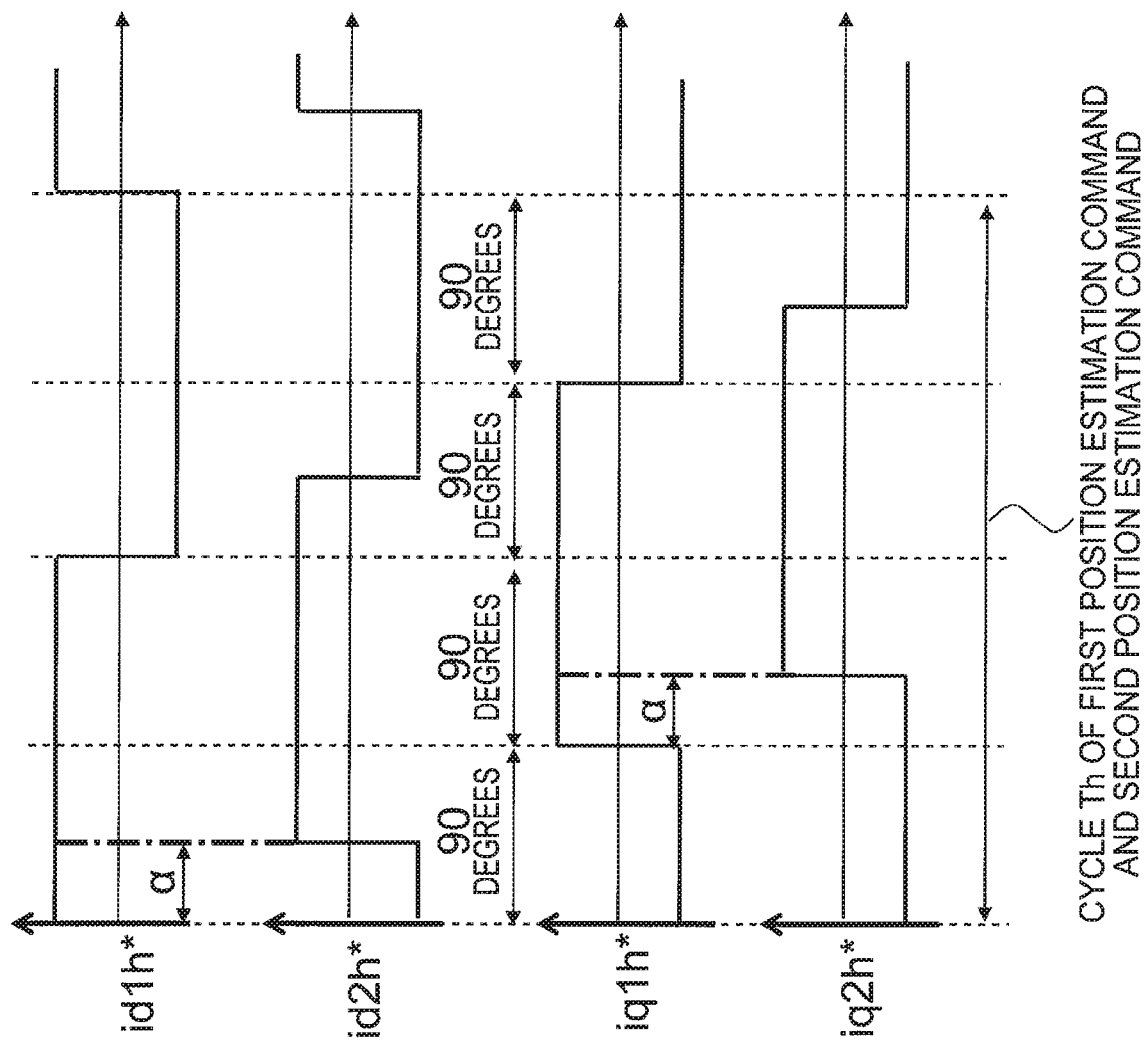
FIG. 12 is a diagram for illustrating the temporal changes in the position estimation commands output respectively from the first position estimation command generator and the second position estimation command generator in the third embodiment of the present invention.

FIG. 12 is a diagram for illustrating the temporal changes in the position estimation commands output respectively from the first position estimation command generator 301 and the second position estimation command generator 302 in the third embodiment of the present invention.

The first position estimation command generator 301 is configured to output a d-axis position estimation command i1$dh^*$ and a q-axis position estimation command i1$gh^*$. On this occasion, as illustrated in FIG. 12, the q-axis position estimation command i1$qh^*$ lags in the phase by 90 degrees from the d-axis position estimation command i1$dh^*$, which changes at the cycle Th of 360 degrees.

A synthetic vector of the d-axis position estimation command i1$dh^*$ and the q-axis position estimation command i1$qh^*$ is a rotation vector, which rotates at the cycle Th on the d-q coordinates illustrated in FIG. 2, by providing the phase difference of 90 degrees between i1$dh^*$ and i1$qh^*$ in this way.

The superimposing device 303 is configured to output an addition result of i1$dh^*$ and id* and an addition result of i1$qh^*$ and iq* to the subtractor 8.

The current controller 10 provides such control that di1$d$ and di1$q$ are 0. Thus, the first winding currents i1$d$ and i1$q$ on the rotational two axes are controlled so as to respectively match id*+i1$df^*$ and iq*i1$qh^*$.

Similarly, the second position estimation command generator 302 is configured to output a d-axis position estimation command i2$dh^*$ and a q-axis position estimation command i2$qh^*$. On this occasion, as illustrated in FIG. 12, the q-axis position estimation command i2$qh^*$ lags in the phase by 90 degrees from the d-axis position estimation command i2$dh^*$, which changes at the cycle Th of 360 degrees. On this occasion, i2$dh^*$ has the phase difference α from i1$dh^*$, and i2$qh^*$ also has the phase difference α from i1$qh^*$.

A synthetic vector of i2$dh^*$ and i2$qh^*$ is a rotation vector, which rotates at the cycle Th on the d-q coordinates illustrated in FIG. 2, and has the phase difference α from the synthetic vector of i1$dh^*$ and i1$qh^*$.

The superimposing device 304 is configured to output an addition result of i2$dh^*$ and id* and an addition result of i2$qh^*$ and iq* to the subtractor 9.

The current controller 11 provides such control that di2$d$ and di2$q$ are 0. Thus, the second winding currents i2$d$ and i2$q$ on the rotational two axes are controlled so as to respectively match id*+i2$dg^*$ and iq*+i2$qh^*$.

On this occasion, when the amplitudes of the first position estimation commands i1$dh^*$ and i1$qh^*$ and the second position estimation commands i2$dh^*$ and i2$qh^*$ are constant, components i1$dh$ and i1$qh$ of the position estimation commands of the first winding currents and components i2$dh$ and i2$qh$ of the position estimation commands of the second winding currents also have constant amplitudes.

Moreover, due to the saliency of the AC rotary machine 1a, amplitudes of frequency components of the position estimation commands included in the first three-phase voltage commands v1$u^{*\prime}$, v1$v^{*\prime}$, and v1$w^{*\prime}$ and the second three-phase voltage commands v2$u^{*\prime}$, v2$v^{*\prime}$, and v2$w^{*\prime}$ change in accordance with the rotor position.

Figure 13:
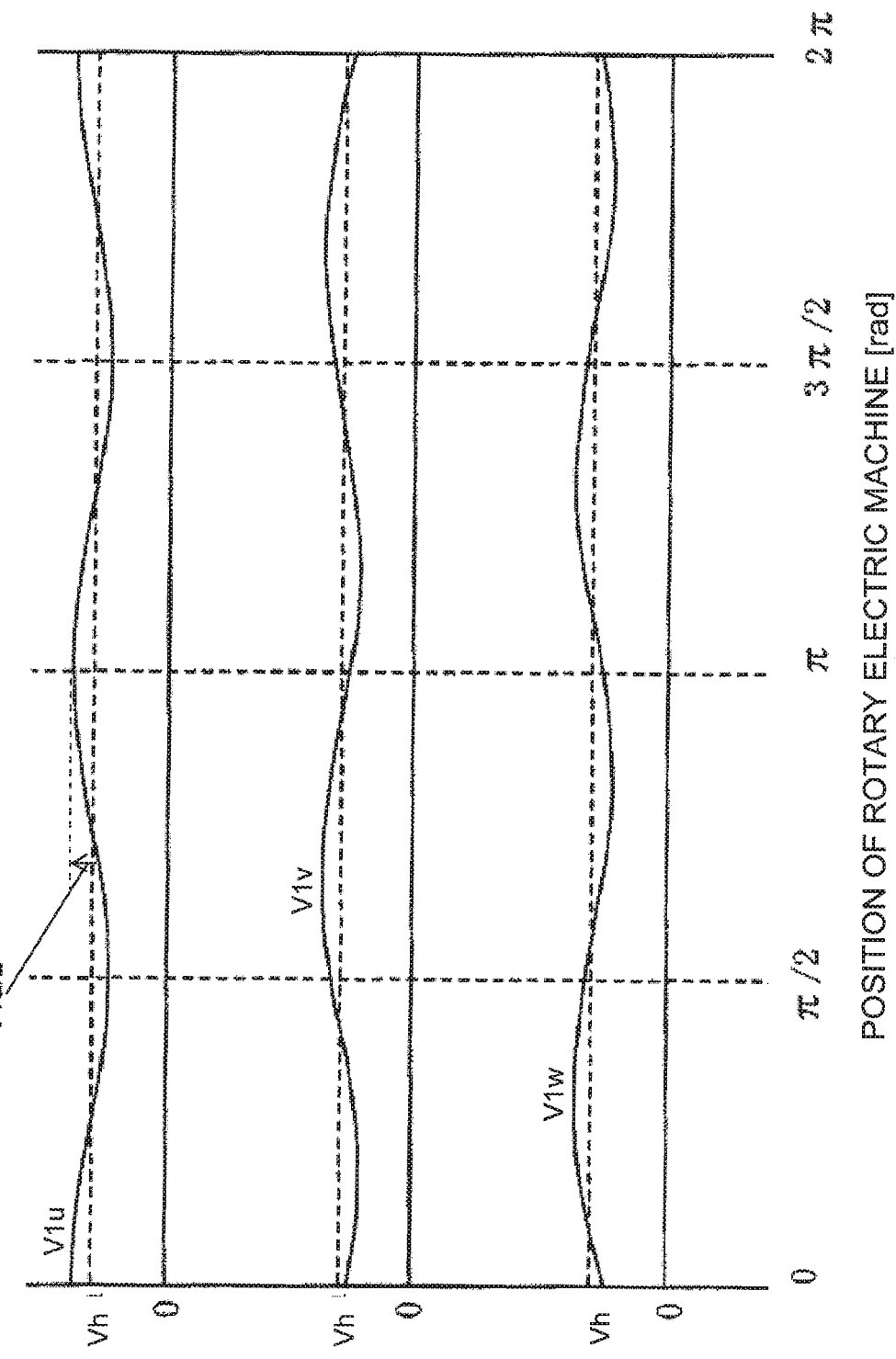
FIG. 13 is a diagram for illustrating the output waveforms of the amplitude calculator in the third embodiment of the present invention.

FIG. 13 is a diagram for illustrating the output waveforms of the amplitude calculator 18$ax$ in the third embodiment of the present invention. Specifically, FIG. 13 is an illustration of amplitudes V1$u$, V1$v$, and V1$w$ of frequency components of the position estimation commands obtained by the amplitude calculator 18$ax$ in the rotation position estimator 18$a$ based on the first three-phase voltage commands v1$u^{*\prime}$, v1$y^{*\prime}$, and v1$w^*$.

The amplitudes of V1$u$, V1$v$, and V1$w$ fluctuate about Vh in accordance with the rotor position. Thus, the position calculator 18$ay$ is configured to extract those fluctuation amounts, thereby calculating the estimated value θest of the rotation position.

As the fluctuation amounts (Vha/2) of the amplitudes of V1u, V1v, and V1w about Vh increase, the estimation accuracy of the rotation position increases as in the first embodiment.

However, when the amplitudes of the first position estimation commands i1dh* and i1qh* and the second position estimation commands i2dh* and i2qh* are increased while the phase difference α is set to 0, the torque ripple, the vibration, and the sound caused by the first position estimation commands and the torque ripple, the vibration, and the sound caused by the second position estimation commands overlap in the same phase. As a result, the torque ripple, the vibration, and the sound generated by the AC rotary machine 1a increase, which is not preferred.

Thus, according to the third embodiment, while the torque ripple of the position estimation commands are maintained to be a value equal to or less than a predetermined value, the first position estimation commands i1dh* and i1qh* and the second position estimation commands i2dh* and i2qh* can be increased by adjusting the phase difference α between the first position estimation commands i1dh* and i1qh* and the second position estimation commands i2dh* and i2qh*.

A relationship between the phase difference α and the fluctuation amount Vha/2 of the amplitudes of the first position estimation commands and the second position estimation commands is similar in shape to that of FIG. 8. In other words, the amplitudes can be set to be large with respect to the amplitudes corresponding to the phase difference α=0 in a range of α equal to or more than 60 degrees and equal to or less than 330 degrees, can further be set to be large in a range of α equal to or more than 120 degrees and equal to or less than 300 degrees, can even further be set to be large in a range of α equal to or more than 150 degrees and equal to or less than 270 degrees, and can still further be set to be large in a range of α equal to or more than 180 degrees and equal to or less than 240 degrees.

Moreover, for an AC rotary machine having a phase difference X [degrees] between a first three-phase winding and a second three-phase winding, the amplitudes can be set to be large in a range of α from X+30 to X+300 [degrees], can further be set to be large in a range of α from X+90 to X+270 [degrees], can even further be set to be large in a range of α from X+120 to X+240 [degrees], and can still further be set to be large in a range of α from X+150 to X+210 [degrees].

As described above, according to the third embodiment, for the torque ripple, the sound, and the vibration of the predetermined frequency components of the position estimation commands, the amplitudes of the position estimation commands can be increased, and the effect of increasing the position estimation accuracy of the rotation position can be provided.

Fourth Embodiment

Figure 14:
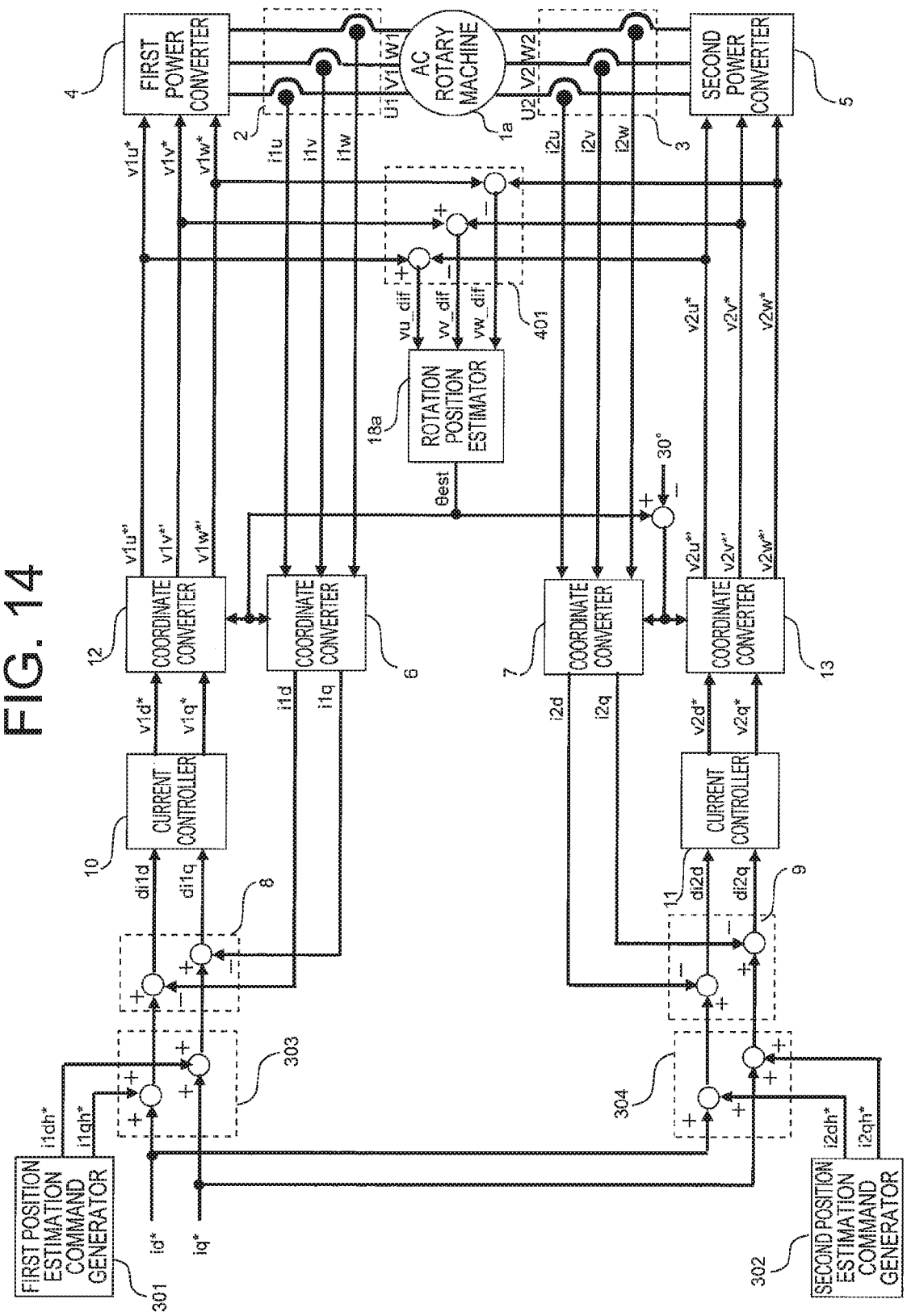
FIG. 14 is a diagram for illustrating the overall configuration of the control device for an AC rotary machine according to a fourth embodiment of the present invention.

FIG. 14 is a diagram for illustrating the overall configuration of the control device for an AC rotary machine according to a fourth embodiment of the present invention. Components corresponding to or similar to those of the second embodiment illustrated in FIG. 9 and the third embodiment illustrated in FIG. 11 are denoted by the same reference symbols.

The configuration of FIG. 14 of the fourth embodiment is different from the configuration of FIG. 11 of the third embodiment in the following two points.

A point that a subtractor 401 is further provided.

A point that the rotation position estimator 18a is configured to calculate the estimated value θest of the rotation position based on the output of the subtractor 401.

The subtractor 401 is configured to respectively subtract the second three-phase voltage commands v2u*', v2v*', and v2w*' calculated by the coordinate converter 13 from the first three-phase voltage commands v1u*', v1v*', and v1w*' calculated by the coordinate converter 12, thereby calculating subtraction values vu_dif, vv_dif, and vw_dif. Further, the rotation position estimator 18a in the fourth embodiment is configured to calculate the estimated value θest of the rotation position based on the subtraction values vu_dif, vv_dif, and vw_dif, which are outputs of the subtractor 401.

Figure 15:
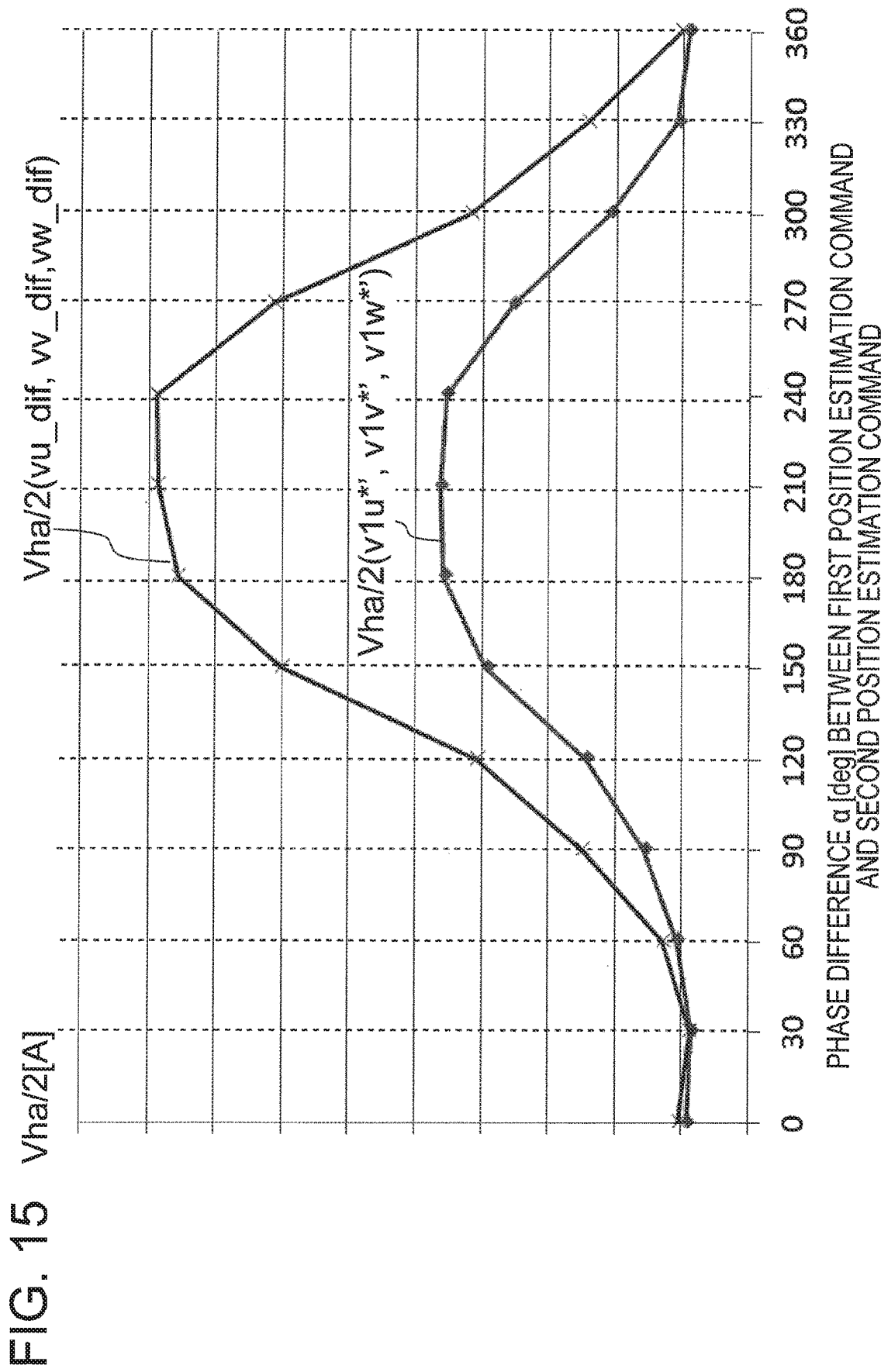
FIG. 15 is a diagram for illustrating a characteristic of amplitudes of position estimation command components of a first three-phase voltage command and a second three-phase voltage command with respect to the phase difference between the first position estimation command and the second position estimation command when the torque ripple of the frequency component of the first position estimation command generated by the AC rotary machine is constant in the fourth embodiment of the present invention.

FIG. 15 is a diagram for illustrating a characteristic of amplitudes (Vha/2) of the position estimation command components of the first three-phase voltage command and the second three-phase voltage command with respect to the phase difference between the first position estimation command and the second position estimation command when the torque ripple of the frequency component of the first position estimation command generated by the AC rotary machine 1a is constant in the fourth embodiment of the present invention.

A characteristic waveform denoted by "Vha/2 (vu_dif vv_dif, vw_dif)" of FIG. 15 represents a characteristic in a case where the estimated value θest of the rotation position is calculated based on the subtraction values vu_dif, vv_dif, and vw_dif each between the first three-phase voltage command and the second three-phase voltage command in the fourth embodiment.

Meanwhile, a characteristic waveform denoted by "Vha/2 (v1u*', v1v*', v1w*')" of FIG. 15 represents the characteristic in the case where the estimated value θest of the rotation position is calculated based on the first three-phase voltage commands v1u*', and v1v*', and v1w*' in the third embodiment.

With reference to FIG. 15, it is appreciated that the amplitudes can be set to be large for the same torque ripple for the characteristic of the fourth embodiment compared with the characteristic of the third embodiment.

As described above, according to the fourth embodiment, the configuration of calculating the estimated value of the rotation position based on the subtraction values between the first three-phase voltage commands and the second three-phase voltage commands is provided. As a result, there is provided such an effect that the estimation accuracy of the rotation position can be further increased than that of the configuration of the third embodiment.

According to the first to fourth embodiments, the first position estimation commands and the second position estimation commands are superimposed on the three-phase stationary coordinates (u-v-w coordinates). However, the present invention is not limited to such a coordinate system. The first position estimation commands and the second position estimation commands may be superimposed on a two-phase stationary coordinates (α-β coordinates), and the same effect can be obtained.

Moreover, the first position estimation commands and the second position estimation commands in the first to fourth embodiments are the rotation vectors rotating at the cycle Th on the stationary coordinates. Thus, it should be understood that a method of carrying out the superimposition of the first position estimation commands and the second position estimation commands on the rotational two axes coordinates (d-q coordinates) to achieve such rotation vectors is included in the present invention. Thus, in the following fifth to eighth embodiments, a specific description is given of the superimposition of the first position estimation command and the second position estimation command on the two-phase stationary coordinates (α-β coordinates).

Fifth Embodiment

Figure 16:
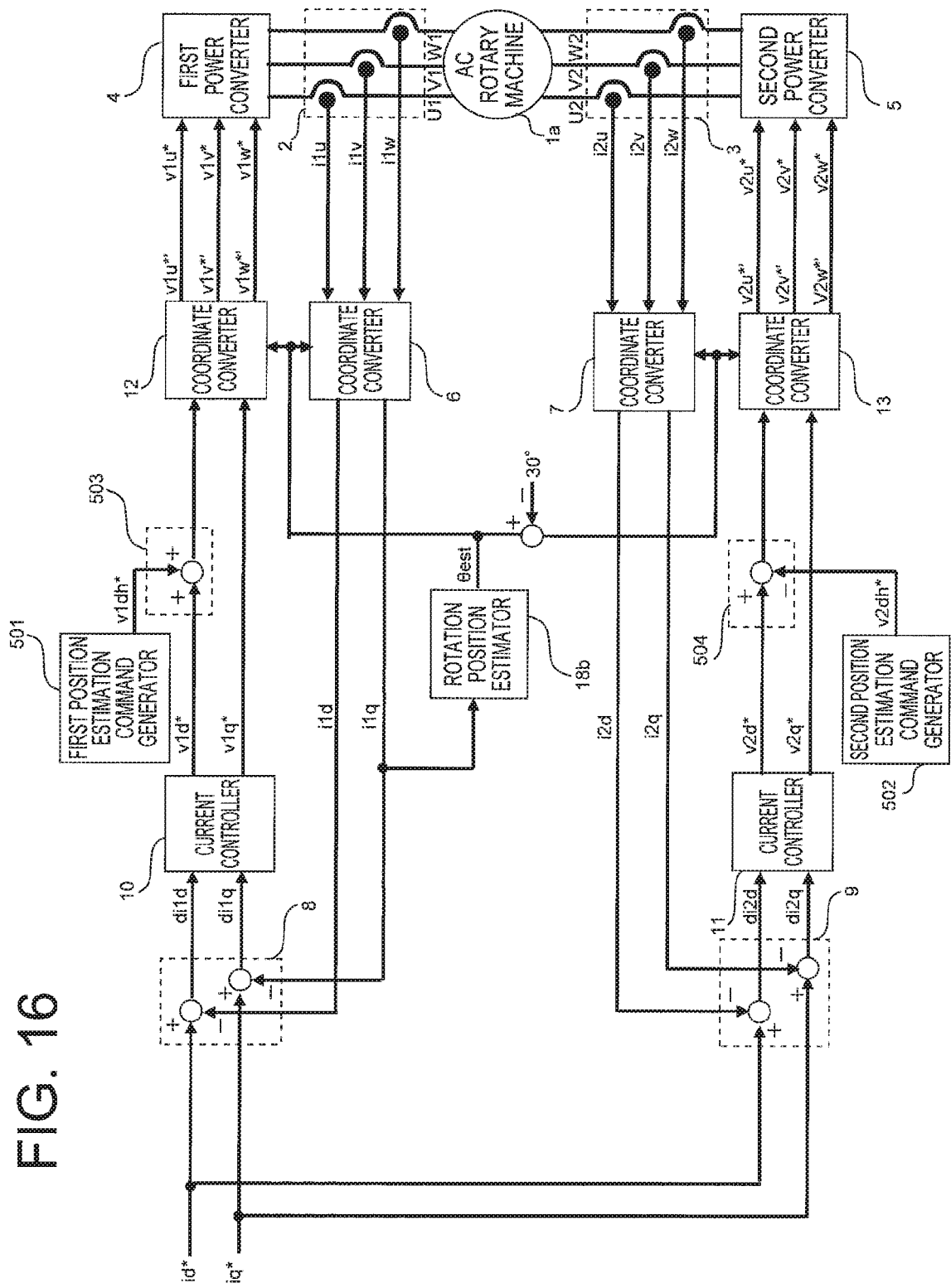
FIG. 16 is a diagram for illustrating the overall configuration of the control device for an AC rotary machine according to a fifth embodiment of the present invention.

FIG. 16 is a diagram for illustrating the overall configuration of the control device for an AC rotary machine according to a fifth embodiment of the present invention. Components corresponding to or similar to those of the first embodiment illustrated in FIG. 1 are denoted by the same reference symbols.

The configuration of FIG. 16 of the fifth embodiment is different from the configuration of FIG. 1 of the first embodiment in the following three points.

A point that a first position estimation command generator 501, a second position estimation command generator 502, a superimposing device 503, and a superimposing device 504 are arranged at different positions in place of the first position estimation command generator 14, the second position estimation command generator 15, the superimposing device 16, and the superimposing device 17.

A point that the first three-phase voltage commands v1u*', v1v*', and v1w*' output from the coordinate converter 12 are directly supplied as the first voltage commands v1u*, v1v*, and v1w* to the first power converter 4, and, similarly, the second three-phase voltage commands v2u*', v2v*', and v2w*' output from the coordinate converter 13 are directly supplied as the second voltage commands v2u*, v2v*, and v2w* to the second power converter 5.

A point that a rotation position estimator 18b is arranged at a different position in place of the rotation position estimator 18a, thereby calculating the estimated value θest of the rotation position based on the first winding current i1q on the rotational two axes.

Figure 17:
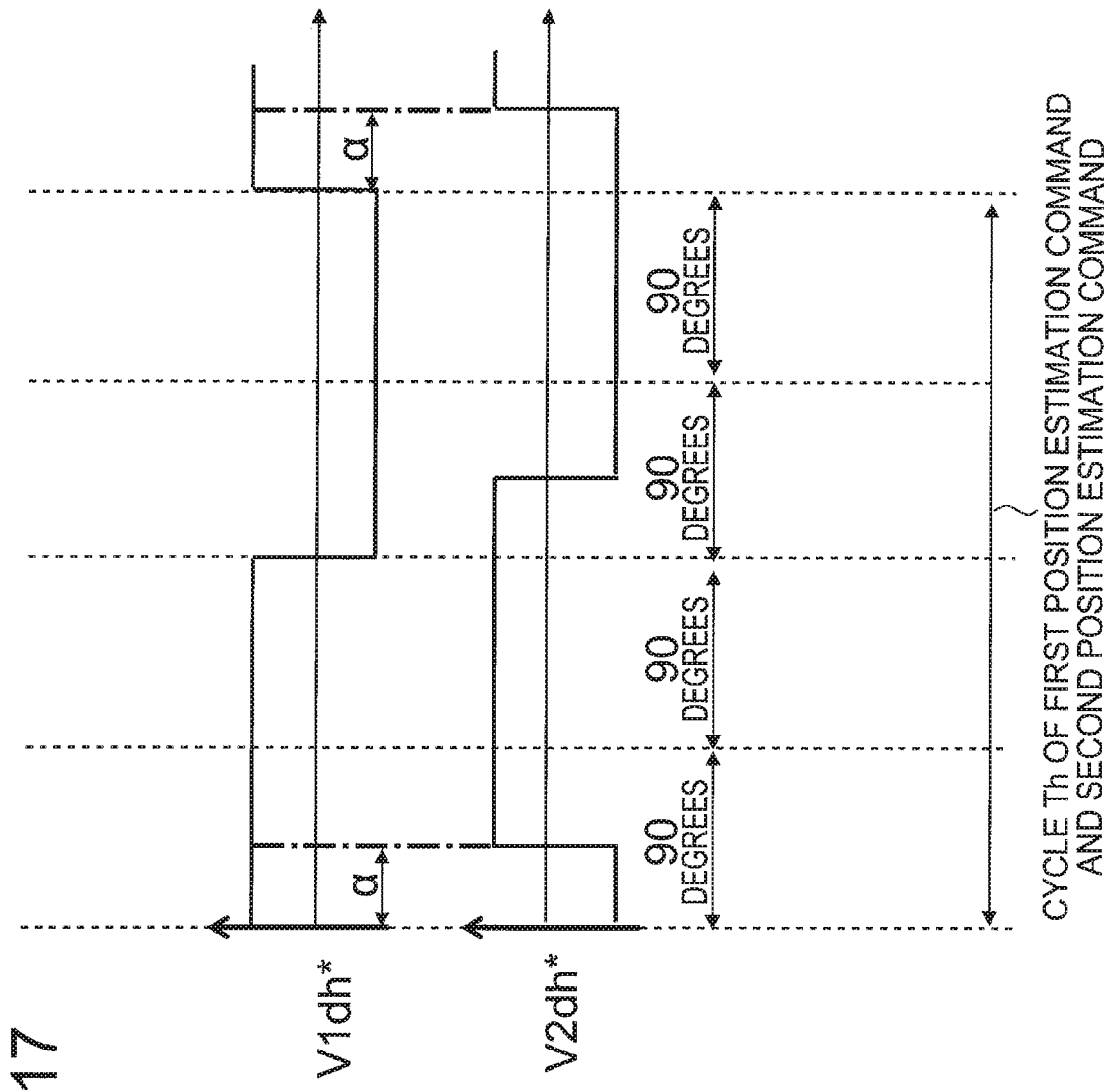
FIG. 17 is a diagram for illustrating the temporal changes in the position estimation commands output respectively from the first position estimation command generator and the second position estimation command generator in the fifth embodiment of the present invention.

FIG. 17 is a diagram for illustrating the temporal changes in the position estimation commands output respectively from the first position estimation command generator 501 and the second position estimation command generator 502 according to the fifth embodiment of the present invention.

As illustrated in FIG. 17, the first position estimation command generator 501 is configured to output a first position estimation command v1dh* at the cycle Th. On this occasion, the first position estimation command v1dh* is a component parallel with an estimated magnetic flux detected at the estimated position θest of the rotation position.

Similarly, as illustrated in FIG. 17, the second position estimation command generator 502 is configured to output a second position estimation command v2dh* at the cycle Th. On this occasion, the second position estimation command v2dh* is a component parallel with an estimated magnetic flux detected at the estimated position θest of the rotation position. Moreover, as illustrated in FIG. 17, the second position estimation command V2dh* has the phase difference α [degrees] with respect to the first position estimation command v1dh*.

The superimposing device 503 is configured to superimpose the first position estimation command v1dh* on the first d-axis voltage command v1d* output from the current controller 10, and output a result of the superimposition to the coordinate converter 12. The superimposing device 504 is configured to superimpose the second position estimation command v2dh* on the second d-axis voltage command v2d* output from the current controller 11, and output a result of the superimposition to the coordinate converter 13.

As a result of the superimposition of the first position estimation command v1dh* on the first d-axis voltage command v1d*, the position estimation command components i1dh and i1qh to be superimposed on the first winding currents i1d and i1q on the rotational two axes are represented by Expression (7).

$$\begin{bmatrix} i_{1dh} \\ i_{1qh} \end{bmatrix} = \frac{1}{(L^2 - l^2)} \begin{bmatrix} L - l\cos\Delta\ \theta \\ -l\sin\Delta\ \theta \end{bmatrix} \int v_{1dh} * dt \quad (7)$$

On this occasion, meanings of respective symbols in Expression (7) are represented by Expression (8), Moreover, Ldest and Lqest mean a d-axis inductance and a q-axis inductance on the rotational two axes estimated at the estimated position θest of the rotation position.

$$\Delta\ \theta = \theta - \theta_{est} \quad (8)$$
$$L_{dest} = L - l\cos 2\Delta\ \theta$$
$$L_{qest} = L + l\cos 2\Delta\ \theta$$
$$L_{dq} = l\sin 2\Delta\ \theta$$
$$L = \frac{L_{dest} + L_{qest}}{2}$$
$$l = \frac{L_{dest} - L_{qest}}{2}$$

In accordance with Expression (7), only when Δθ is 0, that is, only when the rotation position θ of the AC rotary machine 1a and the rotation position estimated value θest match each other, the position estimation command component i1qh matches 0, and when Δθ is not 0, the position estimation command component i1qh does not match 0. Thus, the rotation position estimator 18b carries out such calculation that the position estimation command component i1qh matches 0, thereby causing the estimated value θest of the rotation position to match the rotation position θ of the AC rotary machine 1a.

Figure 18:
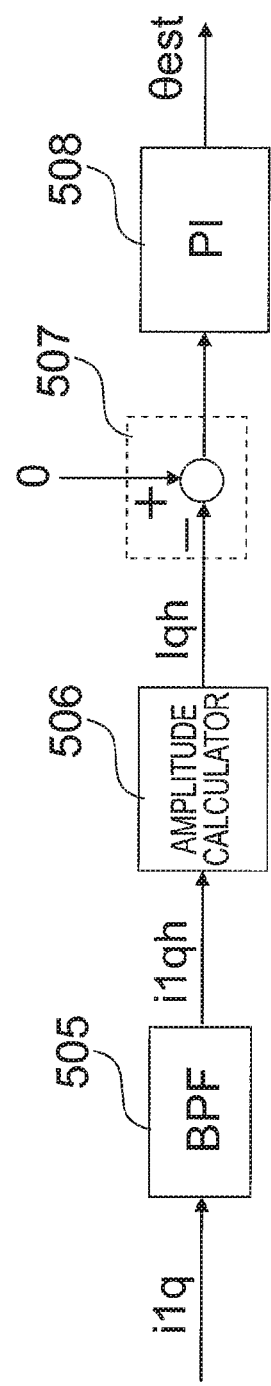
FIG. 18 is a block diagram for illustrating a configuration of the rotation position estimator in the fifth embodiment of the present invention.

FIG. 18 is a block diagram for illustrating a configuration of the rotation position estimator 18b in the fifth embodiment of the present invention. The rotation position estimator 18b includes a band-pass filter 505, an amplitude calculator 506, a subtractor 507, and a PI calculator 508.

The band-pass filter 505 is configured to input the first winding current i1q out of the first winding currents i1d and i1q on the rotational two axes, and extract the component i1qh of the position estimation command included in the first winding current i1q.

The amplitude calculator 506 is configured to calculate an amplitude Iqh of the component i1qh of the position estimation command. As a calculation method, the same configuration as that of the amplitude calculator 18ax illustrated in FIG. 4 of the first embodiment only needs to be employed.

The subtractor 507 is configured to calculate a difference between 0 and Iqh calculated by the amplitude calculator 506. The PI calculator 508 is configured to carry out proportional-integral control so that the difference obtained by the subtractor 507 is 0, and output the estimated value θest of the rotation position.

A description is now given of a relationship between the amplitude value Iqh of the component i1qh of the position estimation command and the estimated value θest of the rotation position. As the amplitude value Iqh with respect to the estimated value θest of the rotation position increases, the S/N ratio increases, and, simultaneously, the influence of the quantization error caused by the A/D conversion by the current detector 3 relatively decreases. Therefore, as the amplitude value Iqh increases, the estimation accuracy of the rotation position increases.

However, when the amplitude of the first position estimation command and the amplitude of the second position estimation command are increased in order to increase the amplitude value Iqh while the phase difference α is set to 0, the torque ripple, the vibration, and the sound caused by the first position estimation command and the torque ripple, the vibration, and the sound caused by the second position estimation command overlap in the same phase.

As a result, the torque ripple, the vibration, and the sound generated by the AC rotary machine 1a increase, which is not preferred. In other words, when the amplitude of the first position estimation command is increased, the torque ripple, the sound, and the vibration of the frequency components of the position estimation commands generated from the AC rotary machine 1a increase.

Thus, according to the fifth embodiment, as illustrated in FIG. 17, the phase difference α is provided between the first position estimation command v1dh* and the second position estimation command v2dh*, thereby providing the phase difference between the torque ripple, the sound, and the vibration generated by the first position estimation command v1dh* and the torque ripple, the sound, and the vibration generated by the second position estimation command v2dh*.

As a result, the amplitude of the component i1qh of the position estimation command can be increased while the torque ripple generated by the AC rotary machine 1a is suppressed to a value equal to or less than a predetermined value, and the amplitude value Iqh with respect to the estimated value θest of the rotation position can be increased, thereby increasing the position estimation accuracy. The phase difference α is set to such a value as to provide a larger Iqh while the magnitude of the torque ripple of the frequency component of the position estimation command when α is 0 is maintained.

Figure 19:
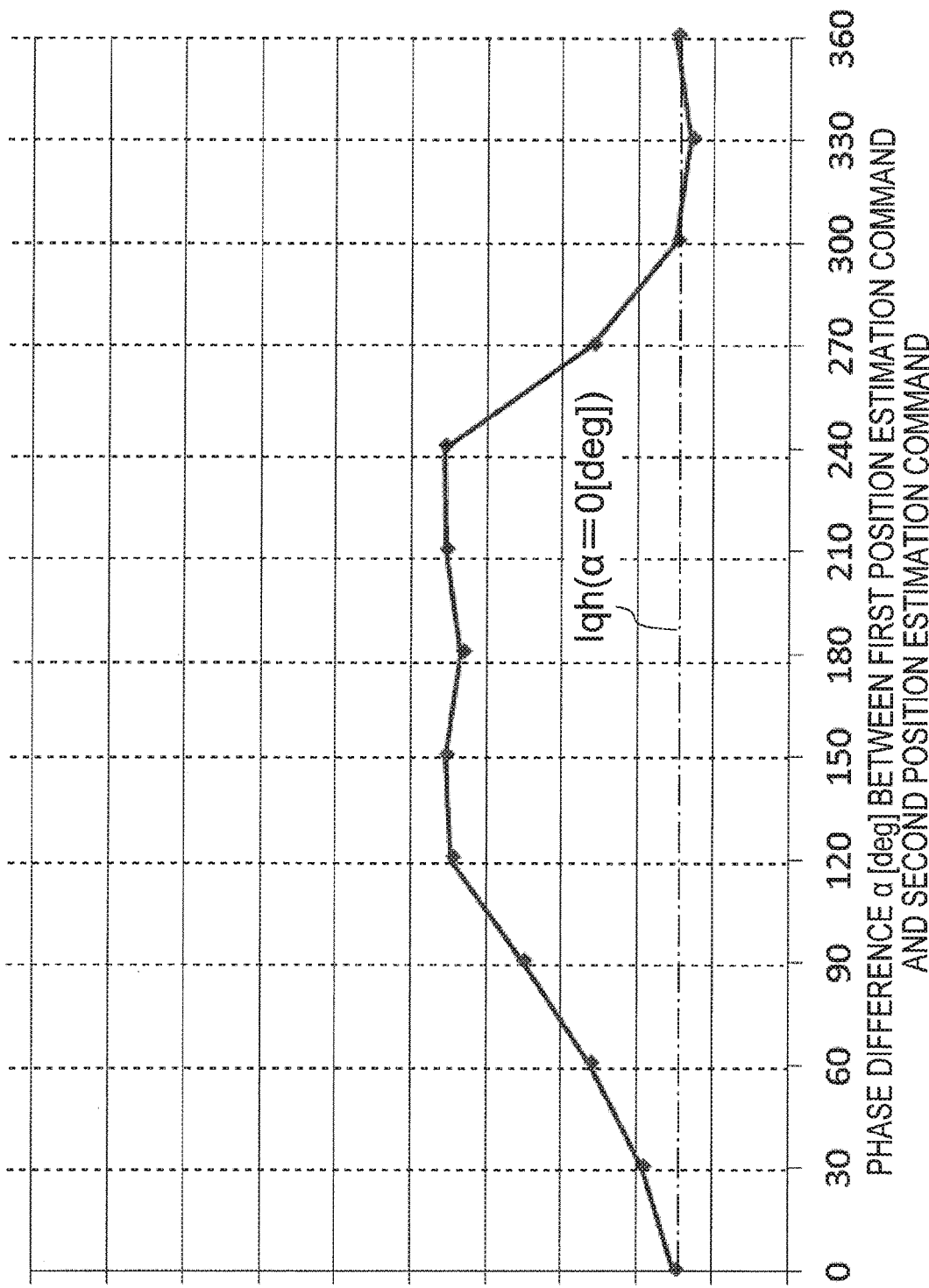
FIG. 19 is a diagram for illustrating a characteristic of an amplitude value of a position estimation current with respect to the phase difference between the first position estimation command and the second position estimation command when the torque ripple of the frequency component of the first position estimation command generated by the AC rotary machine is constant in the fifth embodiment of the present invention.

FIG. 19 is a diagram for illustrating a characteristic of the amplitude value Iqh of the position estimation current i1qh with respect to the phase difference between the first position estimation command and the second position estimation command when the torque ripple of the frequency component of the first position estimation command generated by the AC rotary machine 1a is constant in the fifth embodiment of the present invention. FIG. 19 is a characteristic diagram where the phase difference α is assigned to a horizontal axis, and Iqh is assigned to a vertical axis.

As the amplitude illustrated in FIG. 19 increases, the amplitude value Iqh of the position estimation current i1qh can be set to be larger for the same torque ripple, thereby increasing the estimation accuracy of the rotation position.

With reference to FIG. 19, the amplitude can be set to be large with respect to the amplitude corresponding to the phase difference α=0 in a range of a equal to or more than 30 degrees and equal to or less than 270 degrees, can further be set to be large in a range of α equal to or more than 60 degrees and equal to or less than 270 degrees, can even further be set to be large in a range of a equal to or more than 90 degrees and equal to or less than 270 degrees, and can still further be set to be large in a range of α equal to or more than 120 degrees and equal to or less than 240 degrees.

In other words, this fact means that, when the amplitude of the position estimation current i1qh is the same, the torque ripple of the components of the position estimation commands generated from the AC rotary machine 1a can be decreased by setting the phase difference α in the above-mentioned ranges.

As described above, according to the fifth embodiment, there is provided a configuration in which the first position estimation command and the second position estimation command are superimposed on the components parallel with the estimated magnetic flux, and the phase difference therebetween is set in the range equal to or more than 30 degrees and equal to or less than 270 degrees. As a result, the torque ripple of the frequency components of the position estimation commands generated in the torque of the AC rotary machine is suppressed, and, further, the estimation accuracy of the rotation position can be increased.

It should be understood that, with reference to the modification made from the first embodiment to the third embodiment, also according to the fifth embodiment, the same effect is acquired by superimposing the first position estimation command and the second position estimation command on the current commands, and estimating the rotation position based on the first voltage command v1q*.

Sixth Embodiment

Figure 20:
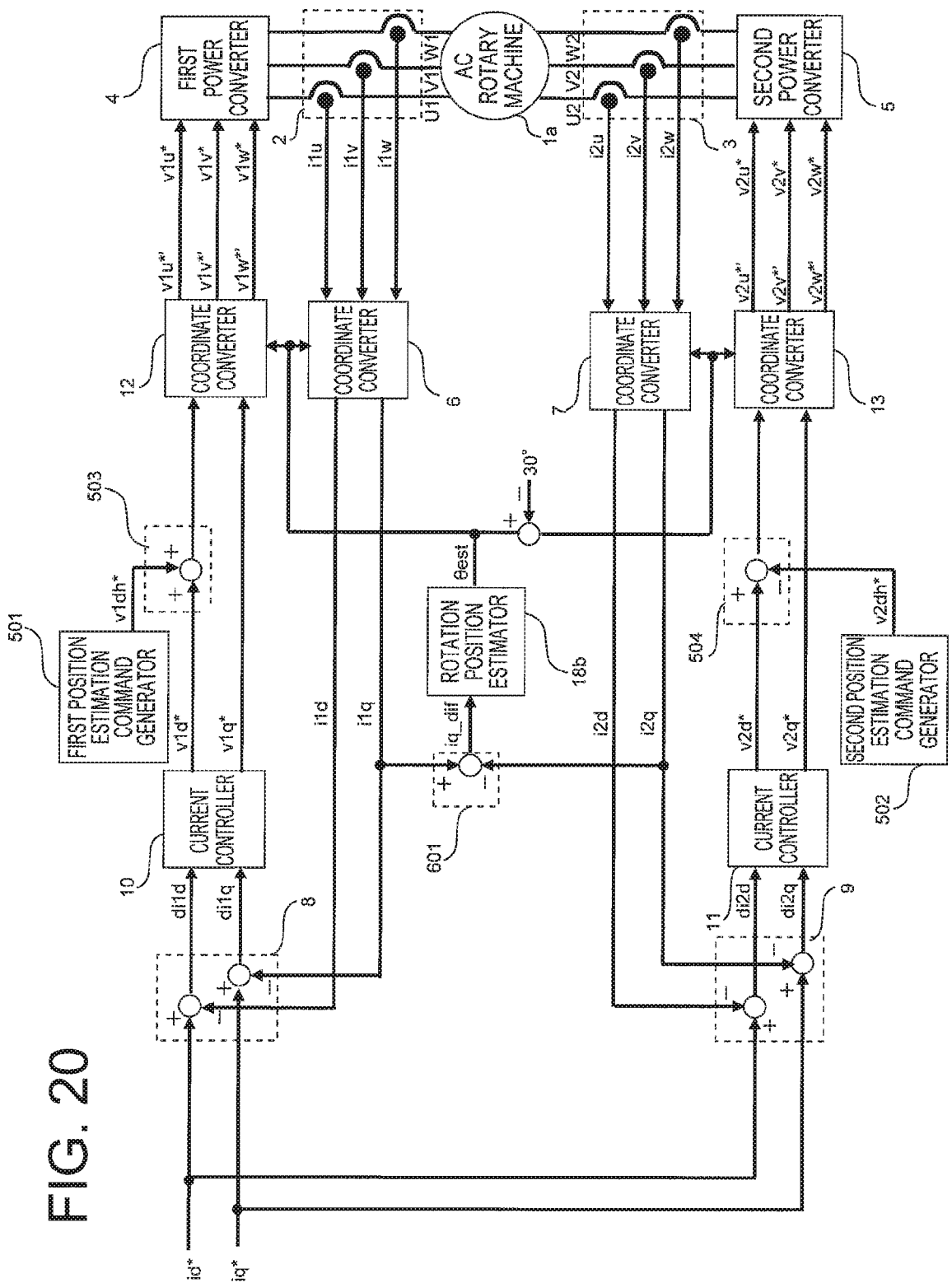
FIG. 20 is a diagram for illustrating the overall configuration of the control device for an AC rotary machine according to a sixth embodiment of the present invention.

FIG. 20 is a diagram for illustrating the overall configuration of the control device for an AC rotary machine according to a sixth embodiment of the present invention. Components corresponding to or similar to those of the fifth embodiment illustrated in FIG. 16 are denoted by the same reference symbols.

The configuration of FIG. 20 of the sixth embodiment is different from the configuration of FIG. 16 of the fifth embodiment in the following two points.

A point that a subtractor 601 is further provided.

A point that the rotation position estimator 18b is configured to calculate the estimated value θest of the rotation position based on the output of the subtractor 601.

The subtractor 601 is configured to subtract the second winding current i2q on the rotational two axes calculated by the coordinate converter 7 from the first winding current i1q on the rotational two axes calculated by the coordinate converter 6, thereby calculating a subtraction value iq_dif. Further, the rotation position estimator 18b in the sixth embodiment is configured to calculate the estimated value θest of the rotation position based on the subtraction values iq_dif, which is the output of the subtractor 601.

Figure 21:
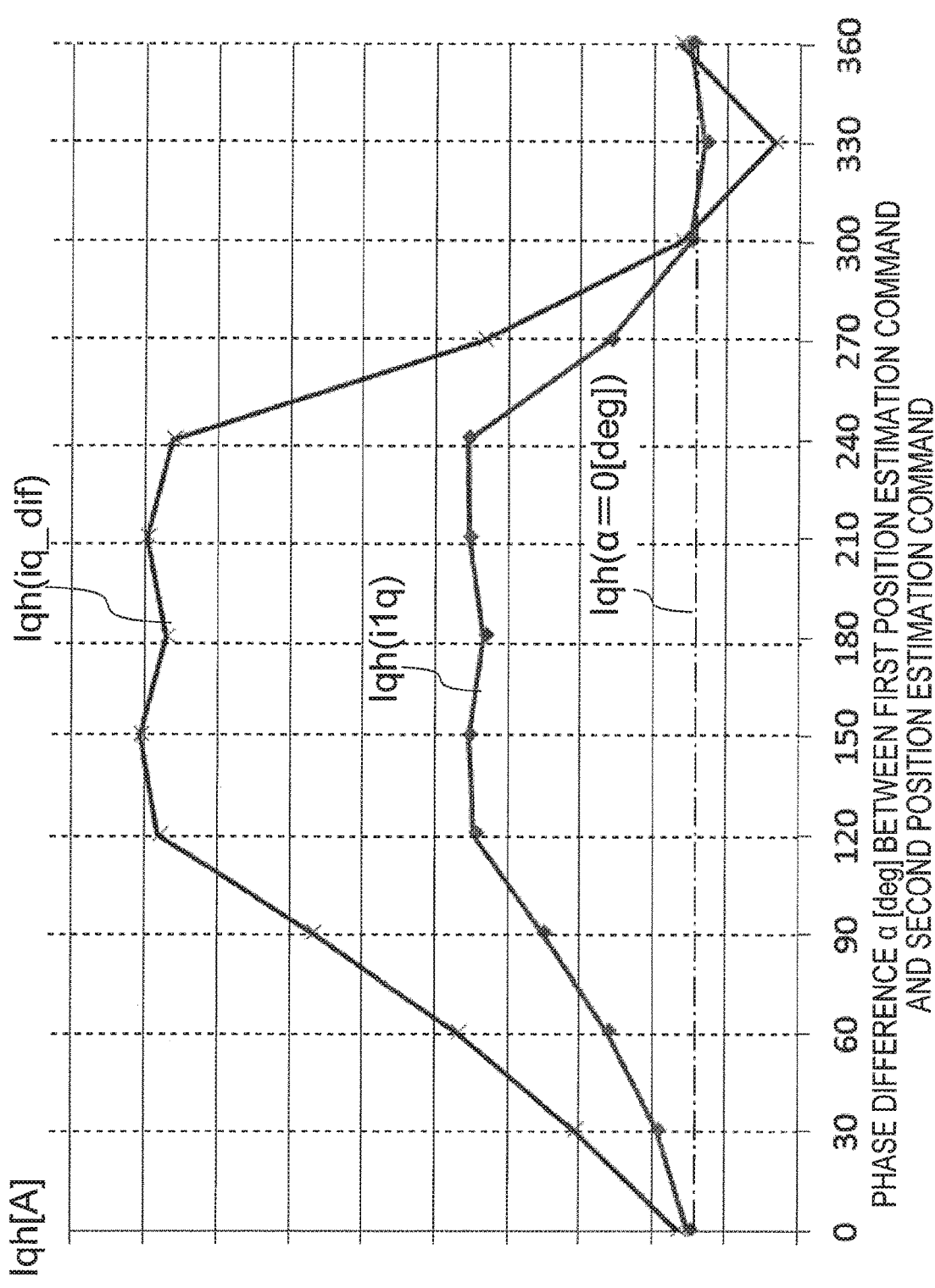
FIG. 21 is a characteristic diagram for illustrating an amplitude of the position estimation current with respect to the phase difference between the first position estimation command and the second position estimation command when the torque ripple of the frequency component of the first position estimation command generated by the AC rotary machine is constant in the sixth embodiment of the present invention.

FIG. 21 is a characteristic diagram for illustrating an amplitude Iqh of the position estimation current with respect to the phase difference between the first position estimation command and the second position estimation command when the torque ripple of the frequency component of the first position estimation command generated by the AC rotary machine 1a is constant in the sixth embodiment of the present invention.

A characteristic waveform denoted by "Iqh (iq_dif)" of FIG. 21 represents a characteristic in a case where the estimated value θest of the rotation position is calculated based on the subtraction value iq_dif between the first winding current i1q and the second winding current i2q in the sixth embodiment.

Meanwhile, a characteristic waveform denoted by "Iqh (i1q)" of FIG. 21 represents the characteristic in the case where the estimated value θest of the rotation position is calculated based on the first winding current i1q in the fifth embodiment.

With reference to FIG. 21, it is appreciated that the amplitudes can be set to be large for the same torque ripple for the characteristic of the sixth embodiment compared with the characteristic of the fifth embodiment.

As described above, according to the sixth embodiment, the configuration of calculating the estimated value of the rotation position based on the subtraction value between the first winding current and the second winding current relating to the q axis is provided. As a result, there is provided such an effect that the estimation accuracy of the rotation position can be further increased than that of the configuration of the fifth embodiment.

It should be understood that, with reference to the modification made from the second embodiment to the fourth embodiment, also according to the sixth embodiment, the same effect is acquired by superimposing the first position estimation command and the second position estimation command on the current commands, and estimating the rotation position based on the subtraction value between the first voltage command v1q* and the second voltage command v2q.

Seventh Embodiment

Figure 22:
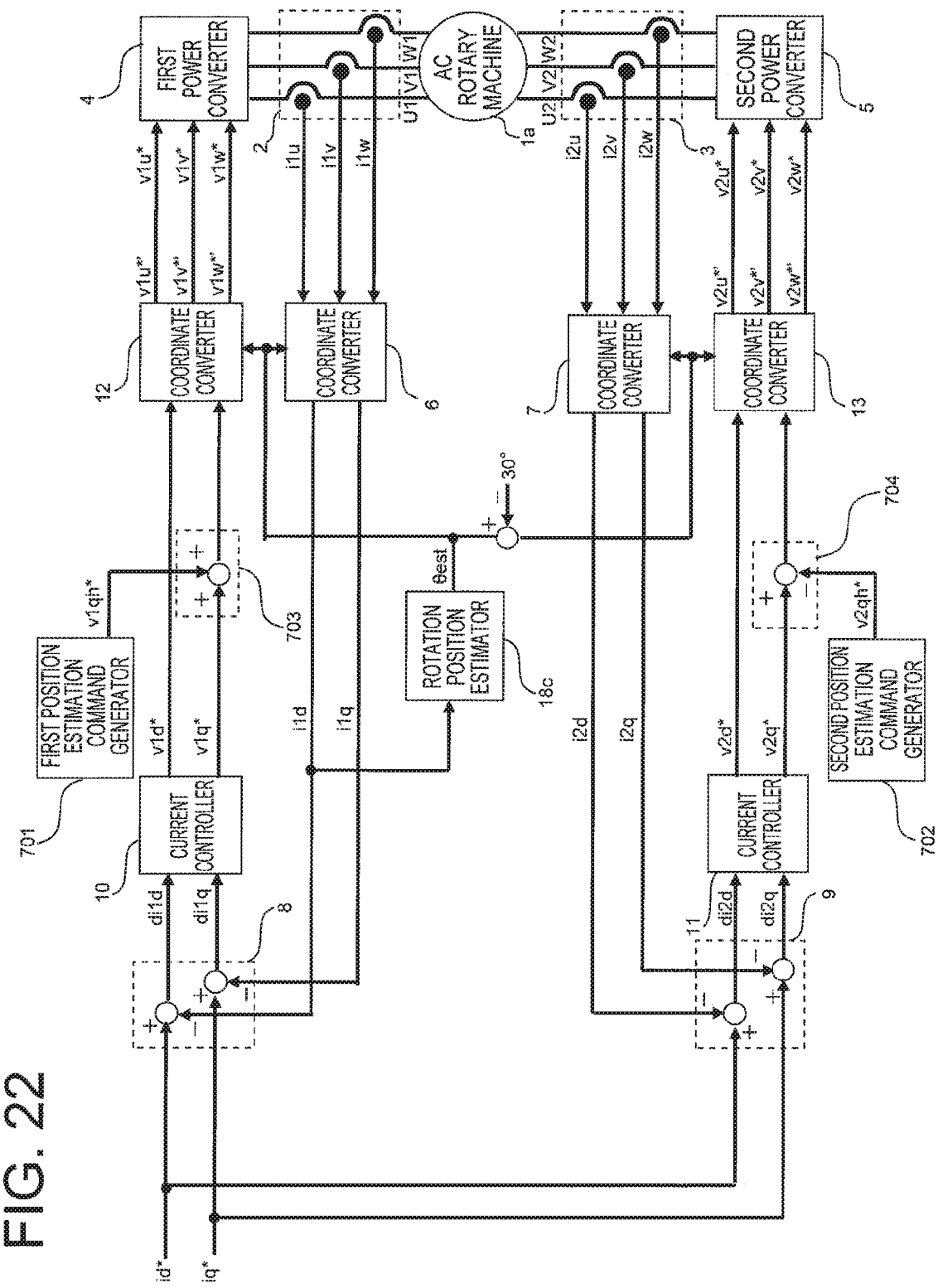
FIG. 22 is a diagram for illustrating the overall configuration of the control device for an AC rotary machine according to a seventh embodiment of the present invention.

FIG. 22 is a diagram for illustrating the overall configuration of the control device for an AC rotary machine according to a seventh embodiment of the present invention. Components corresponding to or similar to those of the first embodiment illustrated in FIG. 1 are denoted by the same reference symbols.

The configuration of FIG. 22 of the seventh embodiment is different from the configuration of FIG. 1 of the first embodiment in the following three points.

A point that a first position estimation command generator 701, a second position estimation command generator 702, a superimposing device 703, and a superimposing device 704 are arranged at different positions in place of the first position estimation command generator 14, the second position estimation command generator 15, the superimposing device 16, and the superimposing device 17.

A point that the first three-phase voltage commands v1u*', v1v*', and v1w*' output from the coordinate converter 12 are directly supplied as the first voltage commands v1u*, v1v*, and v1w* to the first power converter 4, and, similarly, the second three-phase voltage commands v2u*', v2v*', and v2w*' output from the coordinate converter 13 are directly supplied as the second voltage commands v2u*, v2v*, and v2w* to the second power converter 5.

A point that a rotation position estimator 18c is arranged at a different position in place of the rotation position estimator 18a, thereby calculating the estimated value θest of the rotation position based on the first winding current i1d on the rotational two axes.

Figure 23:
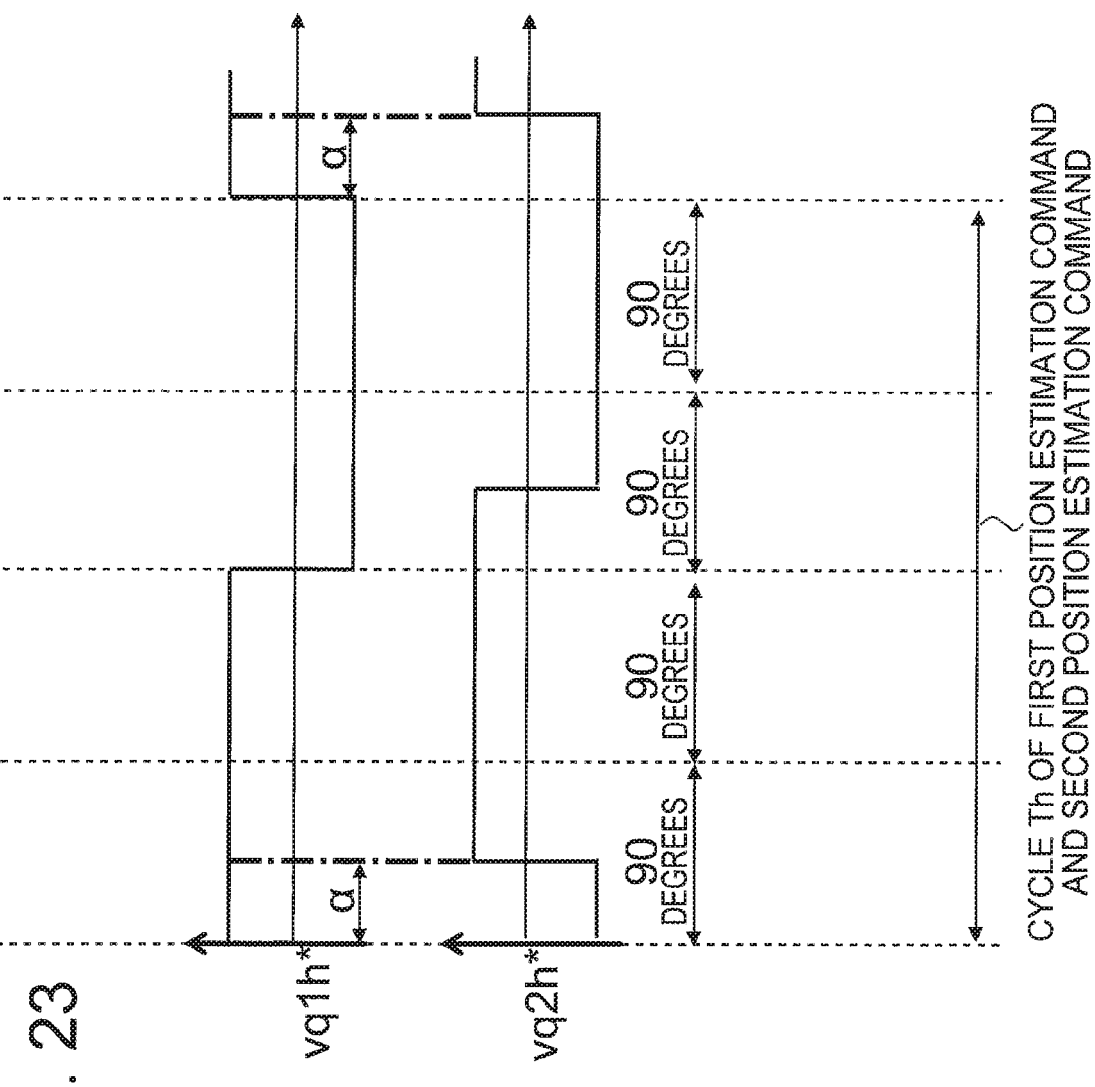
FIG. 23 is a diagram for illustrating the temporal changes in the position estimation commands output respectively from the first position estimation command generator and the second position estimation command generator in the seventh embodiment of the present invention.

FIG. 23 is a diagram for illustrating the temporal changes in the position estimation commands output respectively from the first position estimation command generator 701 and the second position estimation command generator 702 in the seventh embodiment of the present invention.

As illustrated in FIG. 23, the first position estimation command generator 701 is configured to output a first position estimation command v1qh* at the cycle Th. On this occasion, the first position estimation command v1qh* is a component perpendicular to an estimated magnetic flux detected at the estimated position θest of the rotation position.

Similarly, as illustrated in FIG. 23, the second position estimation command generator 702 is configured to output a second position estimation command v2qh* at the cycle Th. On this occasion, the second position estimation command v2qh* is a component perpendicular to an estimated magnetic flux detected at the estimated position θest of the rotation position. Moreover, as illustrated in FIG. 23, the second position estimation command v2qh* has the phase difference α [degrees] with respect to the first position estimation command v1qh*.

The superimposing device 703 is configured to superimpose the first position estimation command v1qh* on the first q-axis voltage command v1q* output from the current controller 10, and output a result of the superimposition to the coordinate converter 12. The superimposing device 704 is configured to superimpose the second position estimation command v2qh* on the second q-axis voltage command v2d* output from the current controller 11, and output a result of the superimposition to the coordinate converter 13.

As a result of the superimposition of the first position estimation command v1qh* on the first q-axis voltage command v1q*, the position estimation command components i1dh and i1qh to be superimposed on the first winding currents i1d and i1q on the rotational two axes are represented as Expression (9)

$$\begin{bmatrix} i_{1dh} \\ i_{1qh} \end{bmatrix} = \frac{1}{(L^2 - l^2)} \begin{bmatrix} -l\sin\Delta\theta \\ L + l\cos\Delta\theta \end{bmatrix} \int v_{1qh} * dt. \qquad (9)$$

In accordance with Expression (9), only when Δθ is 0, that is, only when the rotation position θ of the AC rotary machine 1a and the rotation position estimated value θest match each other, the position estimation command component i1dh matches 0, and when Δθ is not 0, the position estimation command component i1dh does not match 0. Thus, the rotation position estimator 18c carries out such calculation that the position estimation command component i1dh matches 0, thereby causing the estimated value θest of the rotation position to match the rotation position θ of the AC rotary machine 1a.

Figure 24:
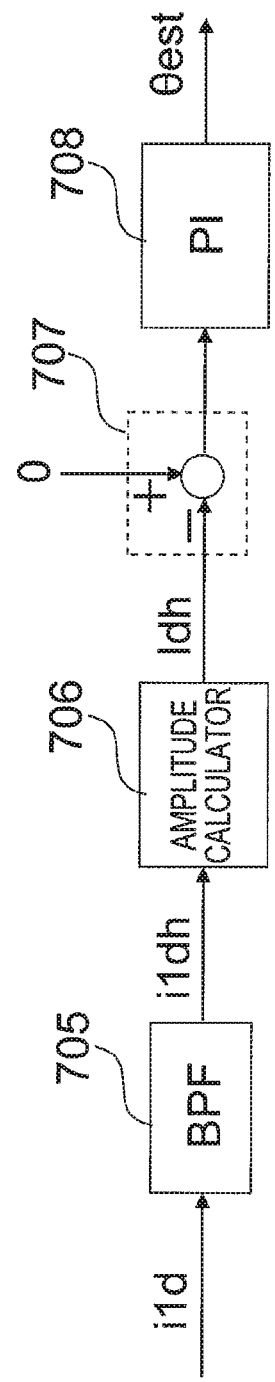
FIG. 24 is a block diagram for illustrating the configuration of the rotation position estimator in the seventh embodiment of the present invention.

FIG. 24 is a block diagram for illustrating the configuration of the rotation position estimator 18c according to the seventh embodiment of the present invention. The rotation position estimator 18c includes a band-pass filter 705, an amplitude calculator 706, a subtractor 707, and a PI calculator 708.

The band-pass filter 705 is configured to input the first winding current out of the first winding currents i1d and i1q on the rotational two axes, and extract the component i1dh of the position estimation command included in the first winding current i1d.

The amplitude calculator 706 is configured to calculate an amplitude Idh of the component i1dh of the position estimation command. As a calculation method, the same configuration as that of the amplitude calculator 18ax illustrated in FIG. 4 of the first embodiment only needs to be employed.

The subtractor 707 is configured to calculate a difference between 0 and Idh calculated by the amplitude calculator 706. The PI calculator 708 is configured to carry out proportional-integral control so that the difference obtained by the subtractor 707 is 0, and output the estimated value θest of the rotation position.

A description is now given of a relationship between the amplitude value Idh of the component i1dh of the position estimation command and the estimated value θest of the rotation position. As the amplitude value Idh with respect to the estimated value θest of the rotation position increases, the S/N ratio increases, and, simultaneously, the influence of the quantization error caused by the A/D conversion by the current detector 3 relatively decreases. Therefore, as the amplitude value Idh increases, the estimation accuracy of the rotation position increases.

However, when the amplitude of the first position estimation command and the amplitude of the second position estimation command are increased in order to increase the amplitude value Idh while the phase difference α is set to 0, the torque ripple, the vibration, and the sound caused by the first position estimation command and the torque ripple, the vibration, and the sound caused by the second position estimation command overlap in the same phase.

As a result, the torque ripple, the sound, and the vibration of the frequency components of the position estimation commands generated from the AC rotary machine 1a increase.

Thus, according to the seventh embodiment, as illustrated in FIG. 23, the phase difference α is provided between the first position estimation command v1qh* and the second position estimation command v2qh*, thereby providing the phase difference between the torque ripple, the sound, and the vibration generated by the first position estimation command v1qh* and the torque ripple, the sound, and the vibration generated by the second position estimation command v2qh*.

As a result, the amplitude of the component i1dh of the position estimation command can be increased while the torque ripple generated by the AC rotary machine 1a is suppressed to a value equal to or less than a predetermined value, and the amplitude value Idh with respect to the estimated value θest of the rotation position can be increased, thereby increasing the position estimation accuracy. The phase difference α is set to such a value as to provide a larger Idh while the magnitude of the torque ripple of the frequency component of the position estimation command when α is 0 is maintained.

Figure 25:
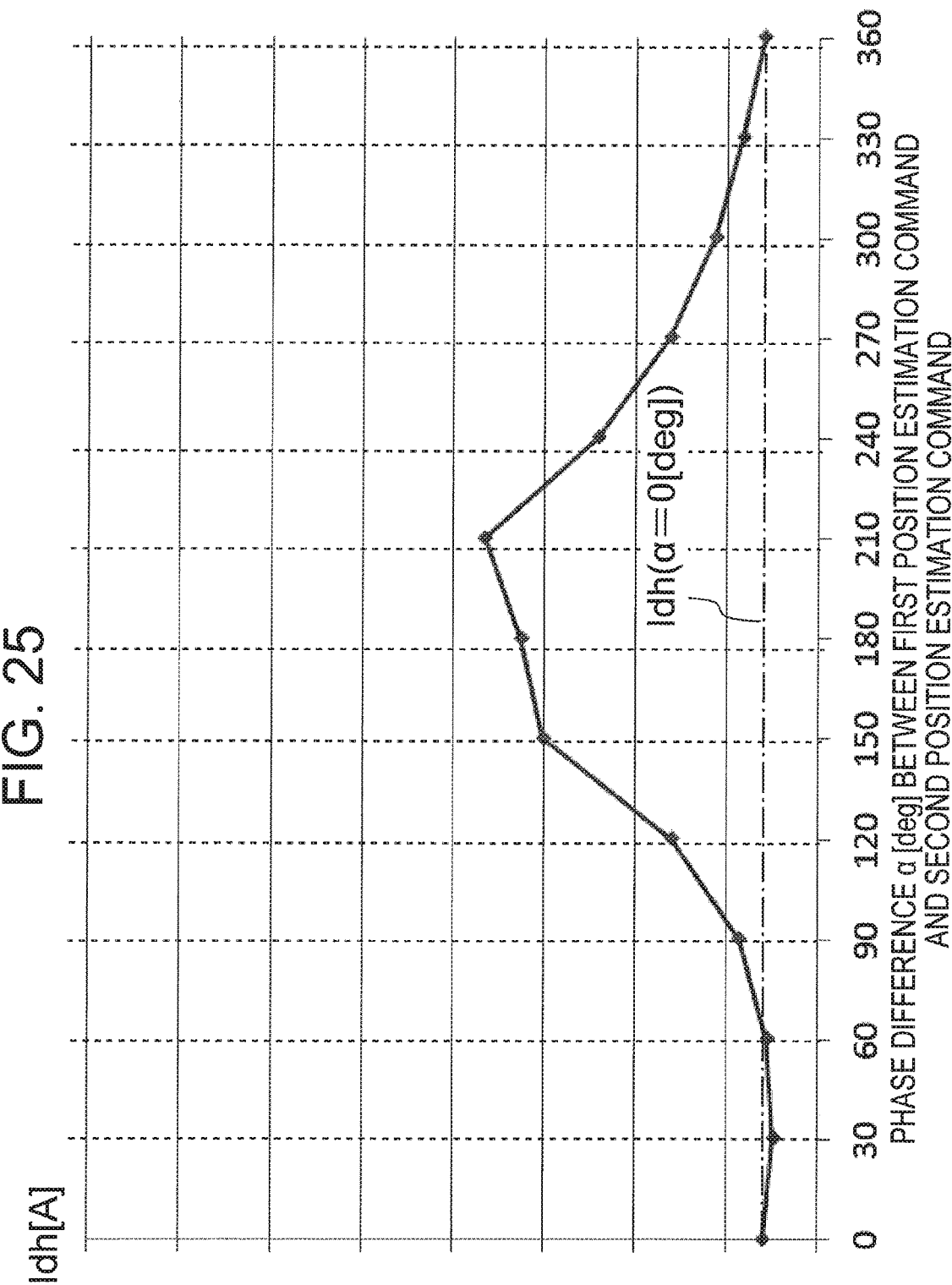
FIG. 25 is a diagram for illustrating the characteristic of the amplitude value of the position estimation current with respect to the phase difference between the first position estimation command and the second position estimation command when the torque ripple of the frequency component of the first position estimation command generated by the AC rotary machine is constant in the seventh embodiment of the present invention.

FIG. 25 is a diagram for illustrating a characteristic of the amplitude value Idh of the position estimation current i1dh with respect to the phase difference between the first position estimation command and the second position estimation command when the torque ripple of the frequency component of the first position estimation command generated by the AC rotary machine 1a is constant in the seventh embodiment of the present invention. FIG. 25 is a characteristic diagram where the phase difference α is assigned to a horizontal axis, and Idh is assigned to a vertical axis.

As the amplitude illustrated in FIG. 25 increases, the amplitude value Idh of the position estimation current i1dh can be set to be larger for the same torque ripple, thereby increasing the estimation accuracy of the rotation position.

With reference to FIG. 25, the amplitude can be set to be large with respect to the amplitude corresponding to the phase difference α=0 in a range of α equal to or more than 90 degrees and equal to or less than 330 degrees, can further be set to be large in a range of α equal to or more than 120 degrees and equal to or less than 300 degrees, can even further be set to be large in a range of α equal to or more than 150 degrees and equal to or less than 270 degrees, and can still further be set to be large in a range of α equal to or more than 150 degrees and equal to or less than 240 degrees.

In other words, this fact means that, when the amplitude of the position estimation current i1dh is the same, the torque ripple of the components of the position estimation commands generated from the AC rotary machine 1a can be decreased by setting the phase difference α in the above-mentioned ranges.

As described above, according to the seventh embodiment, there is provided a configuration in which the first position estimation command and the second position estimation command are superimposed on the components perpendicular to the estimated magnetic flux, and the phase difference therebetween is set in the range equal to or more than 90 degrees and equal to or less than 330 degrees. As a result, the torque ripple of the frequency components of the position estimation commands generated in the torque of the AC rotary machine is suppressed, and, further, the estimation accuracy of the rotation position can be increased.

It should be understood that, with reference to the modification made from the first embodiment to the third embodiment, also according to the seventh embodiment, the same effect is acquired by superimposing the first position estimation command and the second position estimation command on the current commands, and estimating the rotation position based on the first voltage command v1d*.

Eighth Embodiment

Figure 26:
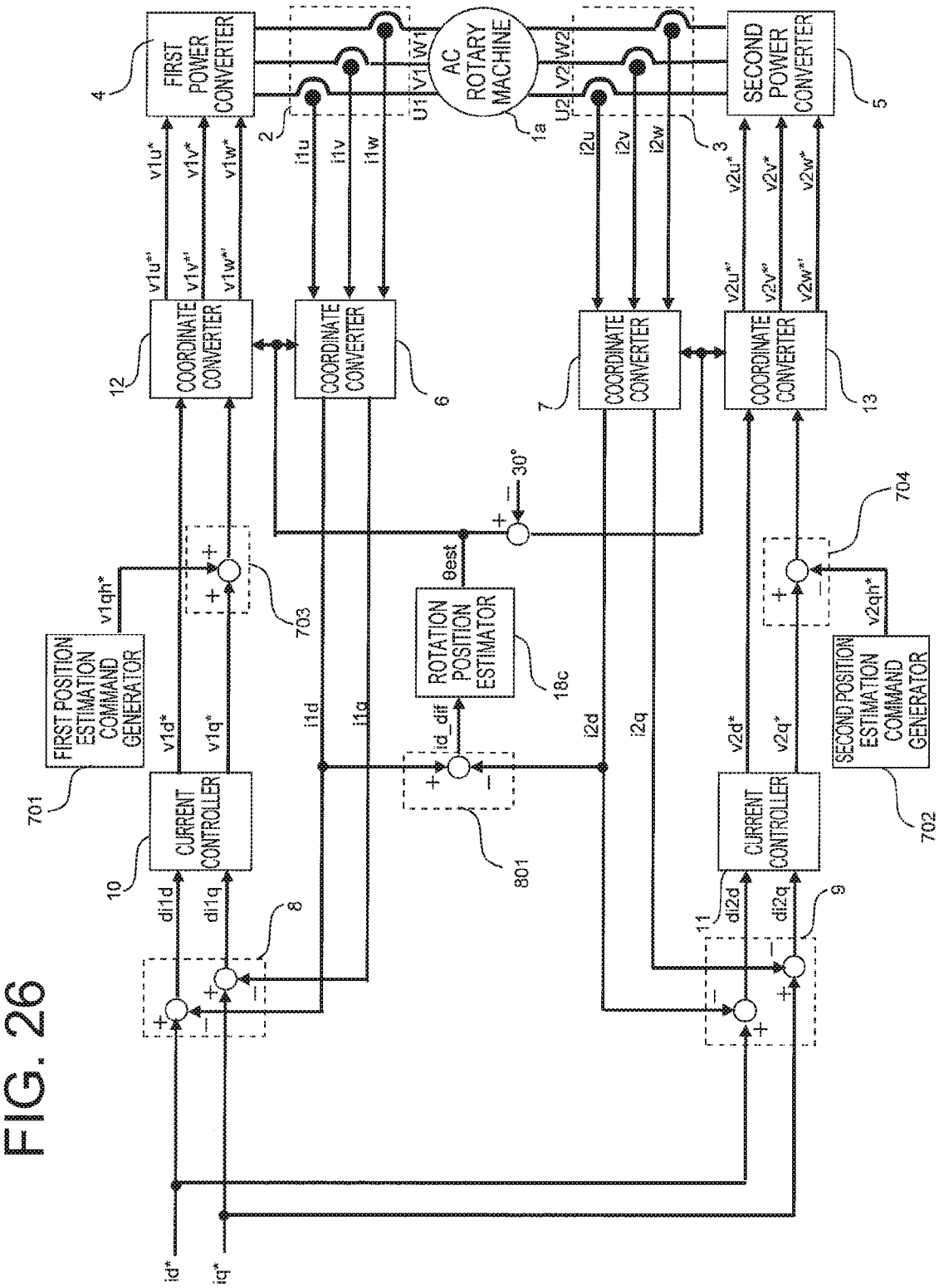
FIG. 26 is a diagram for illustrating the overall configuration of the control device for an AC rotary machine according to an eighth embodiment of the present invention.

FIG. 26 is a diagram for illustrating the overall configuration of the control device for an AC rotary machine according to an eighth embodiment of the present invention. Components corresponding to or similar to those of the seventh embodiment illustrated in FIG. 22 are denoted by the same reference symbols.

The configuration of FIG. 26 of the eighth embodiment is different from the configuration of FIG. 22 of the seventh embodiment in the following two points.

A point that a subtractor 801 is further provided.

A point that the rotation position estimator 18c is configured to calculate the estimated value θest of the rotation position based on the output of the subtractor 801.

The subtractor 801 is configured to subtract the second winding current i2d on the rotational two axes calculated by the coordinate converter 7 from the first winding current i1d on the rotational two axes calculated by the coordinate converter 6, thereby calculating a subtraction value id_dif. Further, the rotation position estimator 18c of the eighth embodiment is configured to calculate the estimated value θest of the rotation position based on the subtraction value id_dif which is the output of the subtractor 801.

Figure 27:
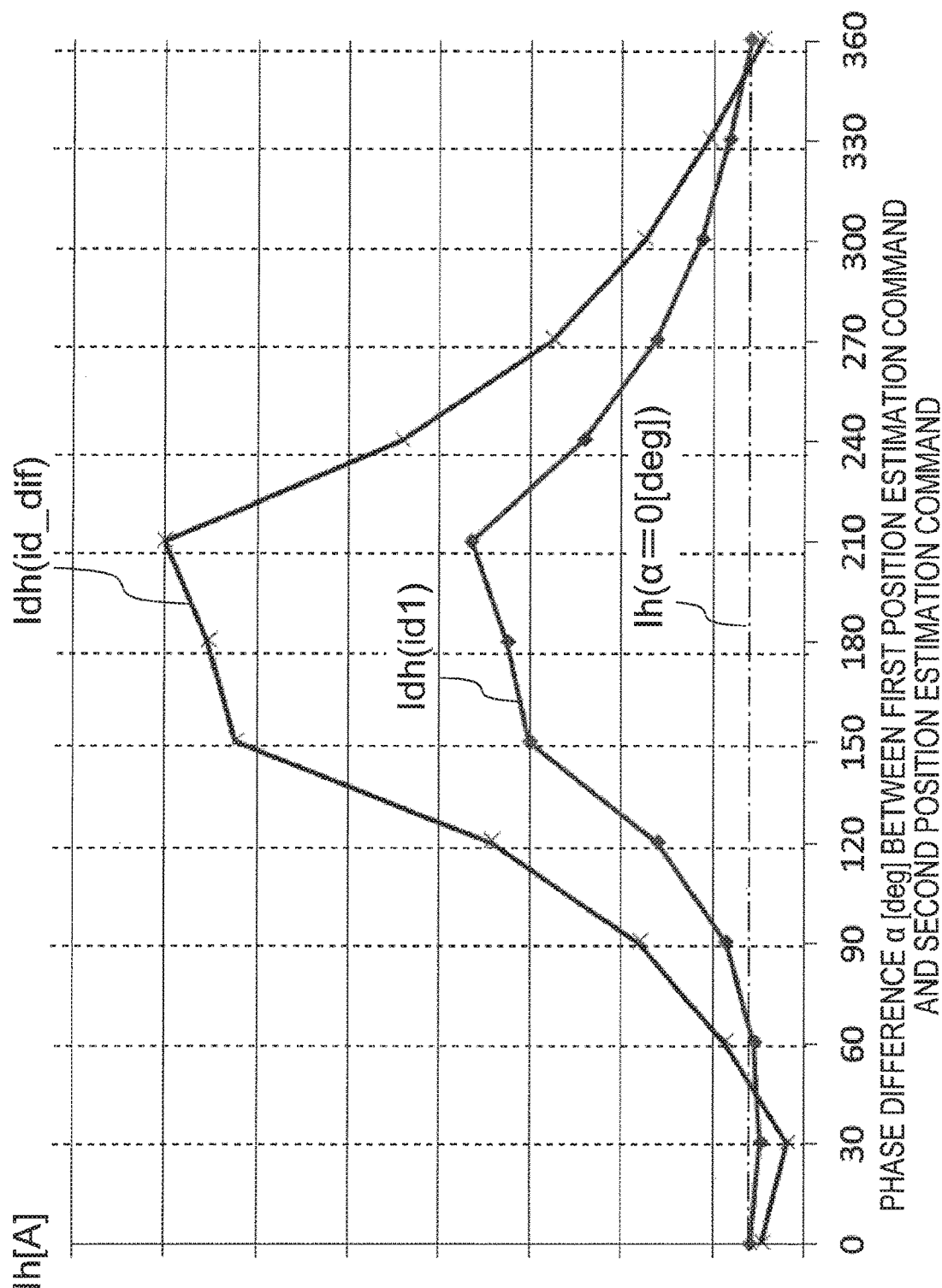
FIG. 27 is a characteristic diagram for illustrating the amplitude of the position estimation current with respect to the phase difference between the first position estimation command and the second position estimation command when the torque ripple of the frequency component of the first position estimation command generated by the AC rotary machine is constant in the eighth embodiment of the present invention.

FIG. 27 is a characteristic diagram for illustrating the amplitude Idh of the position estimation current with respect to the phase difference between the first position estimation command and the second position estimation command when the torque ripple of the frequency component of the first position estimation command generated by the AC rotary machine 1a is constant in the eighth embodiment of the present invention.

A characteristic waveform denoted by "Idh (id_dif)" of FIG. 27 represents a characteristic in a case where the estimated value θest of the rotation position is calculated based on the subtraction value id_dif between the first winding current i1d and the second winding current i2d in the eighth embodiment.

Meanwhile, a characteristic waveform denoted by "Idh (i1d)" of FIG. 27 represents the characteristic in the case where the estimated value θest of the rotation position is calculated based on the first winding current i1d in the seventh embodiment.

With reference to FIG. 27, it is appreciated that the amplitudes can be set to be large for the same torque ripple for the characteristic of the eighth embodiment compared with the characteristic of the seventh embodiment.

As described above, according to the eighth embodiment, the configuration of calculating the estimated value of the rotation position based on the subtraction value between the first winding current and the second winding current relating to the d axis is provided. As a result, there is provided such an effect that the estimation accuracy of the rotation position can be further increased than that of the configuration of the seventh embodiment.

It should be understood that, with reference to the modification made from the second embodiment to the fourth embodiment, also according to the eighth embodiment, the same effect is acquired by superimposing the first position estimation command and the second position estimation command on the current commands, and estimating the rotation position based on the subtraction value between the first voltage command v1d* and the second voltage command v2d*.

Ninth Embodiment

According to the first to eighth embodiments, the control device for an AC rotary machine is described. In contrast, according to a ninth embodiment of the present invention, a description is given of a case in which the control device for an AC rotary machine according to the present invention is applied to an electric power steering device. Specifically, a description is given of a case in which a torque for assisting a steering torque is generated by the control device for an AC rotary machine according to the present invention, thereby constructing an electric power steering device.

Figure 28:
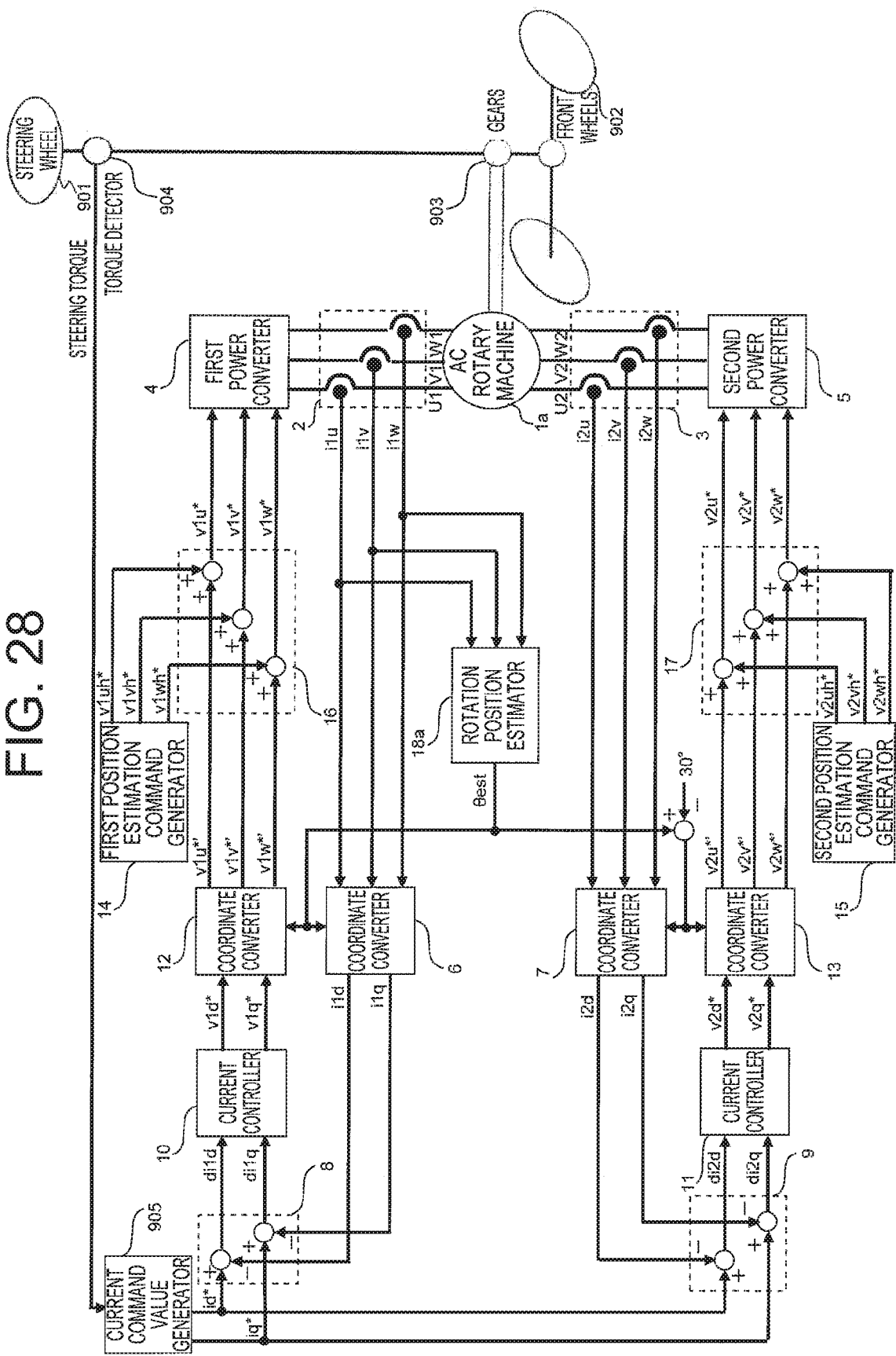
FIG. 28 is a diagram for illustrating a configuration of an electric power steering according to a ninth embodiment of the present invention.

FIG. 28 is a diagram for illustrating the configuration of the electric power steering according to the ninth embodiment of the present invention. Components denoted by the same reference symbols as in the first to eighth embodiments represent the same or corresponding components.

In FIG. 28, a driver turns a steering wheel 901 leftward/rightward, thereby steering front wheels 902. A torque detector 904 is configured to detect a steering torque of a steering system, and output a detected torque to a current command value generator 905.

The current command value generator 905 is configured to calculate the current commands id* and iq* to be output to the AC rotary machine 1a based on the detected torque by the torque detector 904 so that the AC rotary machine 1a generates the torque for assisting the steering torque of the steering system. The AC rotary machine 1a is configured to generate the torque for assisting the steering torque via gears 903.

As described above, according to the ninth embodiment, there is provided a configuration in which the control device for an AC rotary machine, which is configured to provide the phase difference between the first position estimation command and the second position estimation command, is applied to the electric power steering device, thereby generating the torque for assisting the steering torque of the steering system.

With this configuration, the ripple of the frequency components of the position estimation commands included in the steering torque can be decreased. As a result, noise and vibration generated from the electric power steering device can be decreased, and the electric power steering device capable of decreasing a sense of discomfort felt by the driver or passengers can be realized.

The invention claimed is:

1. A control device for a rotary machine, comprising:
an AC rotary machine having a rotor structure for generating saliency, and including first three-phase windings and second three-phase windings;
a first current detector configured to detect a current flowing through each of the first three-phase windings as a first winding current;
a second current detector configured to detect a current flowing through each of the second three-phase windings as a second winding current;
a controller configured to calculate a first voltage command so that the first winding current detected by the first current detector matches a first current command, which is a command value directed to the first winding current, and to calculate a second voltage command so that the second winding current detected by the second current detector matches a second current command, which is a command value directed to the second winding current;
a first power converter configured to apply a voltage to each phase of the first three-phase windings based on the first voltage command;
a second power converter configured to apply a voltage to each phase of the second three-phase windings based on the second voltage command;
a first position estimation command generator configured to generate a first position estimation command having a first frequency;
a second position estimation command generator configured to generate a second position estimation command having the first frequency; and
a rotation position estimator configured to extract an amplitude value of a component of the first frequency based on at least one of the first winding current or the second winding current, to thereby estimate a rotation position of the AC rotary machine based on a magnitude of the amplitude value, wherein:
the first position estimation command generator and the second position estimation command generator are configured to output the first position estimation command and the second position estimation command, respectively, while providing a phase difference between the first position estimation command and the second position estimation command; and
the controller is configured to superimpose the first position estimation command on the first voltage command to output a result of superimposition to the first power converter, and to superimpose the second position estimation command on the second voltage command to output a result of superimposition to the second power converter.

2. A control device for a rotary machine according to claim 1, wherein the rotation position estimator is configured to estimate the rotation position of the AC rotary machine based on a value obtained by subtracting the second winding current from the first winding current.

3. A control device for a rotary machine according to claim 2, wherein:
the first three-phase windings and the second three-phase windings of the AC rotary machine have a phase difference of a real value being X degrees;

the controller is configured to carry out superimposition of the first position estimation command and the second position estimation command on stationary coordinates; and the first position estimation command generator and the second position estimation command generator are configured to output the first position estimation command and the second position estimation command, respectively, so that the phase difference δ has a value of X+30 degrees≤δ≤X+300 degrees.

4. A control device for a rotary machine according to claim 1, wherein:

the first three-phase windings and the second three-phase windings of the AC rotary machine have a phase difference of a real value being X degrees;

the controller is configured to carry out superimposition of the first position estimation command and the second position estimation command on stationary coordinates; and the first position estimation command generator and the second position estimation command generator are configured to output the first position estimation command and the second position estimation command, respectively, so that the phase difference δ has a value of X+60 degrees≤δ≤X+270 degrees.

5. A control device for a rotary machine according to claim 1, wherein:

the controller is configured to carry out superimposition of a component of the first position estimation command and a component of the second position estimation command that are respectively parallel with an estimated magnetic flux direction on rotational two-axis coordinates; and the first position estimation command generator and the second position estimation command generator are configured to output the first position estimation command and the second position estimation command, respectively, so that the phase difference δ has a value of 30 degrees≤δ≤270 degrees.

6. A control device for a rotary machine according to claim 1, wherein:

the controller is configured to carry out superimposition of the first position estimation command and the second position estimation command on a component perpendicular to an estimated magnetic flux direction on rotational two-axis coordinates; and the first position estimation command generator and the second position estimation command generator are configured to output the first position estimation command and the second position estimation command, respectively, so that the phase difference δ has a value of 90 degrees≤δ≤330 degrees.

7. A control device for an electric power steering, comprising the control device for an rotary machine of claim 1, wherein the controller is configured to calculate the first voltage command and the second voltage command so that the AC rotary machine generates a torque for assisting a steering torque of a steering system.

8. A control device for a rotary machine, comprising:

an AC rotary machine having a rotor structure for generating saliency, and including first three-phase windings and second three-phase windings;

a first current detector configured to detect a current flowing through each of the first three-phase windings as a first winding current;

a second current detector configured to detect a current flowing through each of the second three-phase windings as a second winding current;

a controller configured to calculate a first voltage command so that the first winding current detected by the first current detector matches a first current command, which is a command value directed to the first winding current, and to calculate a second voltage command so that the second winding current detected by the second current detector matches a second current command, which is a command value directed to the second winding current;

a first power converter configured to apply a voltage to each phase of the first three-phase windings based on the first voltage command;

a second power converter configured to apply a voltage to each phase of the second three-phase windings based on the second voltage command;

a first position estimation command generator configured to generate a first position estimation command having a first frequency;

a second position estimation command generator configured to generate a second position estimation command having the first frequency; and a rotation position estimator configured to extract an amplitude value of a component of the first frequency based on at least one of the first voltage command or the second voltage command, to thereby estimate a rotation position of the AC rotary machine based on a magnitude of the amplitude value, wherein:

the first position estimation command generator and the second position estimation command generator are configured to output the first position estimation command and the second position estimation command, respectively, while providing a phase difference between the first position estimation command and the second position estimation command; and the controller is configured to calculate the first voltage command while setting a value obtained by superimposing the first position estimation command on the first current command to a new first current command, and to calculate the second voltage command while setting a value obtained by superimposing the second position estimation command on the second current command to a new second current command.

9. A control device for a rotary machine according to claim 8, wherein the rotation position estimator is configured to estimate the rotation position of the AC rotary machine based on a value obtained by subtracting the second voltage command from the first voltage command.

* * * * *